(12) United States Patent
Deroover et al.

(10) Patent No.: US 7,637,994 B2
(45) Date of Patent: Dec. 29, 2009

(54) YELLOW PIGMENTS AND NON-AQUEOUS PIGMENT DISPERSIONS

(75) Inventors: Geert Deroover, Lier (BE); Jan Gilleir, Mortsel (BE)

(73) Assignee: Agfa Graphics NV, Mortsel (BE)

( * ) Notice: Subject to any disclaimer, the term of this patent is extended or adjusted under 35 U.S.C. 154(b) by 0 days.

(21) Appl. No.: 12/094,798

(22) PCT Filed: Nov. 28, 2006

(86) PCT No.: PCT/EP2006/069021

§ 371 (c)(1),
(2), (4) Date: May 23, 2008

(87) PCT Pub. No.: WO2008/034472

PCT Pub. Date: Mar. 27, 2008

(65) Prior Publication Data

US 2009/0025604 A1    Jan. 29, 2009

Related U.S. Application Data

(60) Provisional application No. 60/749,792, filed on Dec. 13, 2005.

(30) Foreign Application Priority Data

Nov. 28, 2005   (EP)  ................................. 05111356

(51) Int. Cl.
*C09B 67/20*      (2006.01)
*C09B 67/00*      (2006.01)
*C09D 11/00*      (2006.01)
*C09D 11/10*      (2006.01)

(52) U.S. Cl. ................ 106/494; 106/31.75; 106/31.77; 106/31.78; 106/493; 106/496; 106/498

(58) Field of Classification Search .............. 106/31.75, 106/31.77, 31.78, 493, 494, 496, 498
See application file for complete search history.

(56) References Cited

U.S. PATENT DOCUMENTS

| 3,759,731 | A | 9/1973 | Kühne et al. |
| 4,461,647 | A | 7/1984 | Schofield et al. |
| 5,274,010 | A | 12/1993 | Bugnon et al. |
| 2008/0207806 | A1 * | 8/2008 | Jaunky et al. ................ 524/190 |
| 2008/0227894 | A1 * | 9/2008 | Loccufier et al. .............. 524/88 |
| 2008/0308004 | A1 * | 12/2008 | Deroover et al. .......... 106/31.75 |
| 2008/0312358 | A1 * | 12/2008 | Deroover et al. ............. 523/333 |

FOREIGN PATENT DOCUMENTS

| EP | 0 957 136 A2 | 11/1999 |
| EP | 1790696 A1 * | 5/2007 |
| EP | 1790697 A1 * | 5/2007 |
| GB | 2 356 634 A | 5/2001 |
| GB | 2 356 866 A | 6/2001 |

OTHER PUBLICATIONS

Official communication issued in the International Application No. PCT/EP2006/069021, mailed on Oct. 10, 2007.

* cited by examiner

*Primary Examiner*—Anthony J Green
(74) *Attorney, Agent, or Firm*—Keating and Bennett, LLP

(57) ABSTRACT

A color pigment containing, based upon the total weight of the pigment, at least 70.0 weight % of a first compound COP according to Formula (I):

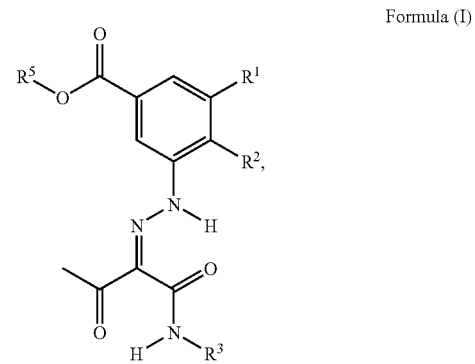

Formula (I)

wherein one of $R^1$ and $R^2$ is hydrogen and the other one of $R^1$ and $R^2$ represents —$COOR^4$; $R^4$ and $R^5$ represent methyl; $R^3$ is selected from the group consisting of:

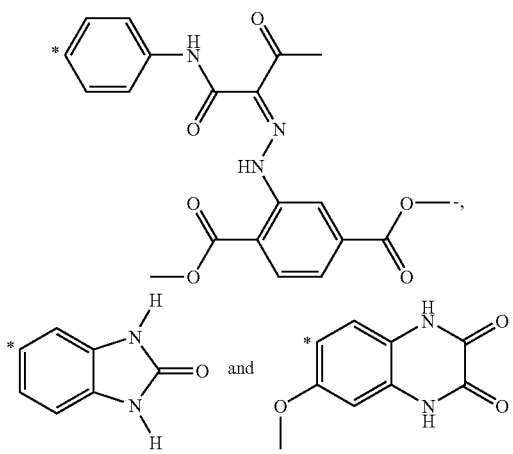

with C* representing the point of attachment of $R^3$ to the nitrogen in Formula (I); and having a pigment surface including between 2.0 and 30.0 weight %, based upon the total weight of the pigment of a second compound according to Formula (I), wherein —$R^1$, $R^{2-}$, $R^3$, $R^4$ and $R^5$ have the same meaning as above with the exception that at least one of $R^4$ and $R^5$ represents hydrogen. Also, methods of preparation of the pigment and non-aqueous pigment dispersions.

16 Claims, No Drawings

YELLOW PIGMENTS AND NON-AQUEOUS PIGMENT DISPERSIONS

CROSS-REFERENCE TO RELATED APPLICATIONS

This application is a 371 National Stage Application of PCT/EP2006/069021, filed Nov. 28, 2006. This application claims the benefit of U.S. Provisional Application No. 60/749,792, filed Dec. 13, 2005, which is incorporated by reference herein in its entirety. In addition, this application claims the benefit of European Application No. 05111356.1, filed Nov. 28, 2005, which is also incorporated by reference herein in its entirety.

BACKGROUND OF THE INVENTION

1. Field of the Invention

The present invention relates to surface modified azo pigments and to non-aqueous pigment dispersions and pigmented inkjet inks including these pigments. The present invention also relates to a method for preparing the pigment and non-aqueous pigment dispersions thereof.

2. Description of the Related Art

Pigment dispersions are made using a dispersant. A dispersant is a substance for promoting the formation and stabilization of a dispersion of pigment particles in a dispersion medium. Dispersants are generally surface-active materials having an anionic, cationic or non-ionic structure. The presence of a dispersant substantially reduces the required dispersing energy. Dispersed pigment particles may have a tendency to re-agglomerate after the dispersing operation due to mutual attraction forces. The use of dispersants also counteracts this re-agglomeration tendency of the pigment particles.

The dispersant has to meet particularly high requirements when used for inkjet inks. Inadequate dispersing manifests itself as increased viscosity in liquid systems, loss of brilliance and/or hue shifts. Moreover, particularly good dispersion of the pigment particles is required to ensure unimpeded passage of the pigment particles through the nozzles of the print head in an inkjet printer, which are usually only a few micrometers in diameter. In addition, pigment particle agglomeration and the associated blockage of the printer nozzles has to be avoided during the standby periods of the printer.

Many polymeric dispersants contain in one part of the molecule so-called anchor groups, which adsorb onto the pigments to be dispersed. In a spatially separate part of the molecule, polymeric dispersants have polymer chains sticking out whereby pigment particles are made compatible with the dispersion medium, i.e., stabilized.

In aqueous inkjet inks, the polymeric dispersants generally contain hydrophobic anchor groups exhibiting a high affinity for the pigment surface and hydrophilic polymer chains for stabilizing the pigments in the aqueous dispersion medium.

The preparation of good thermally stable dispersions with submicron particles is more difficult for non-aqueous inkjet inks, such as solvent based, oil based and radiation curable inkjet inks. The pigments are especially difficult to disperse when they have a non-polar surface.

These problems have led to the design of very specific polymeric dispersants wherein the anchor groups are pigment derivatives. For example, EP 0763378 A (TOYO INK) discloses a pigment composition including a non-aqueous type pigment dispersing agent having a portion which has a high affinity with a pigment and which has at least one type selected from the group consisting of an organic dye, anthraquinone and acridone only at a terminal end or at both terminal ends of at least one polymer selected from a linear urethane polymer and a linear acrylic polymer, and a pigment.

Another approach for dispersing pigments with non-polar surfaces in non-aqueous dispersion media is changing the surface to a more polar surface by addition of compounds known as dispersion synergists. A dispersion synergist is a compound that promotes the adsorption of the polymeric dispersant on the surface of the pigment. It is suggested that the synergist should possess the pigment structure substituted by one or more sulphonic acid groups or ammonium salts thereof.

U.S. Pat. No. 4,461,647 (ICI) discloses a dispersion of a pigment in an organic liquid containing a water-insoluble asymmetric disazo compound including a central divalent group free from acidic and other ionic substituents linked through azo groups to two monovalent end groups wherein one end group, the first, is free from acidic and other ionic substituents and the other end group, the second, carries a single substituted ammonium-acid salt group.

U.S. Pat. No. 4,057,436 (ICI) discloses pigment dispersions in organic liquids using polymeric or resinous dispersing agents in the presence of a substituted ammonium salt of a colored acid wherein there are between 16 and 60 carbon atoms contained in at least 3 chains attached to the N-atom of the substituted ammonium ion.

U.S. Pat. No. 6,641,655 (AVECIA) discloses the use of a diquaternary ammonium salt of a colored acid as a fluidizing agent wherein the diquaternary ammonium cation contains two or more nitrogen atoms.

Although these dispersion synergists work fine for some pigments, many other pigments cannot be dispersed to an acceptable quality in a non-aqueous medium. This is the case for yellow azo pigments, such as C.I. Pigment Yellow 120, C.I. Pigment Yellow 155, C.I. Pigment Yellow 175 and C.I. Pigment Yellow 213, for which it is difficult to obtain stable non-aqueous pigment dispersions, especially stable non-aqueous inkjet inks.

Various techniques of surface modification of a color pigment have been investigated. GB 1080115 (KOEGE KEMISK VAERK) discloses easily dispersible pigments having high resistance towards flocculation, which are produced by bringing the pigment in the presence of water into contact with from 8 to 25% of a long chain aliphatic amine present wholly or partly as the free base, and thereafter drying the pigment.

In U.S. Pat. No. 4,220,473 (SUN CHEMICAL), the properties of azo arylamide pigments are improved by treating them with dimer acid-based amines.

The crude pigment after synthesis usually needs further processing to purify the pigment. In U.S. Pat. No. 4,370,269 (HOECHST), the monoazo pigment is purified simply by washing with water.

U.S. Pat. No. 4,124,582 (HOECHST) discloses a process for the purification of azo pigments, wherein the crude pigment is stirred for some time in an aqueous alkaline suspension in a pH range from 9 to 12, preferably from 11 to 12, at temperatures between 20 to 80° C. and subsequently the crude pigment is filtered off and washed neutral. The pigments treated by this process show a clearer and more brilliant shade and have greater fastness to bleeding when incorporated into a thermoplastic material than the untreated pigments.

This last step of washing and drying the pigments is usually referred to by pigment manufacturers as the 'Finish' step of the pigment. U.S. 2006/0167236 (CLARIANT) discloses a process for preparing disazo pigments, bearing some resemblance to C.I. Pigment Yellow 155, by subjecting the azo coupling product to a finish in at least one organic solvent in the presence of a base selected from the group consisting of alkali metal hydroxides and alkali metal alkoxides, or in an aqueous solution containing the at least one organic solvent, at alkali pH≧9.

For consistent image quality, inkjet inks require a dispersion stability capable of dealing with high temperatures (above 60° C.) during transport of the ink to a customer, jetting at elevated temperatures and changes in the dispersion medium of the inkjet ink during use, for example, evaporation of solvent and increasing concentrations of humectants, penetrants and other additives.

Therefore, it is highly desirable to be able to manufacture pigment inkjet inks including C.I. Pigment Yellow 120, C.I. Pigment Yellow 155, C.I. Pigment Yellow 175 or C.I. Pigment Yellow 213 as the pigment in a non-aqueous medium exhibiting a high dispersion quality and stability.

SUMMARY OF THE INVENTION

In order to overcome the problems described above, preferred embodiments of the present invention provide novel yellow pigments for preparing yellow non-aqueous pigment dispersions exhibiting high dispersion quality and stability.

Further advantages of the preferred embodiments of the present invention will become apparent from the description hereinafter.

Other features, elements, steps, characteristics and advantages of the present invention will become more apparent from the following detailed description of preferred embodiments of the present invention.

DETAILED DESCRIPTION OF THE PREFERRED EMBODIMENTS

It has been discovered that non-aqueous pigment dispersions of high dispersion quality and stability are obtained by a specific modification of existing yellow pigments.

Advantages of the preferred embodiments of the present invention have been achieved with a color pigment containing, based upon the total weight of the pigment, at least 70.0 weight % of a first compound COP according to Formula (I):

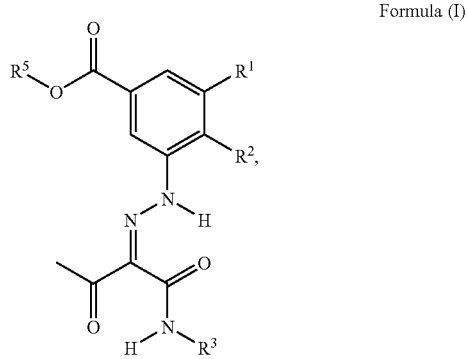

Formula (I)

wherein one of $R^1$ and $R^2$ is hydrogen and the other one of $R^1$ and $R^2$ represents —COOR$^4$; $R^4$ and $R^5$ represent methyl; $R^3$ is selected from the group consisting of:

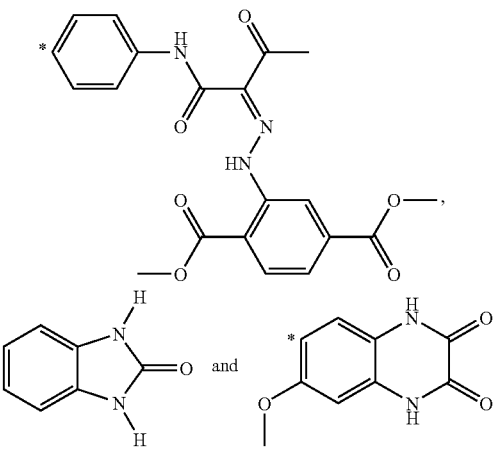

with C* representing the point of attachment of $R^3$ to the nitrogen in Formula (I); and having a pigment surface including between 2.0 and 30.0 weight % based upon the total weight of the pigment of a second compound SEC according to Formula (I), wherein $R^1$, $R^2$, $R^3$, $R^4$ and $R^5$ have the same meaning as above with the exception that at least one of $R^4$ and $R^5$ represents hydrogen.

Advantages of the preferred embodiments of the present invention have also been achieved with a method of preparing a color pigment including the steps of: a) providing a liquid medium including a color pigment selected from the group consisting of C.I. Pigment Yellow 120, C.I. Pigment Yellow 155, C.I. Pigment Yellow 175 and C.I. Pigment Yellow 213; and b) forming a pigment surface including the second compound SEC according to Formula (I) by performing step b1) and/or b2): b1) hydrolyzing one or two of the methyl ester groups —COOR$^4$ and —COOR$^5$ of the color pigment molecules on the pigment surface; b2) adding the second compound SEC according to Formula (I) to the liquid medium including the color pigment; and c) removing the liquid medium to obtain a dry color pigment Advantages of the preferred embodiments of the present invention have also been achieved with a method of preparing a non-aqueous pigment dispersion including the steps of: a) providing a non-aqueous liquid medium including a color pigment selected from the group consisting of C.I. Pigment Yellow 120, C.I. Pigment Yellow 155, C.I. Pigment Yellow 175 and C.I. Pigment Yellow 213; and b) forming a pigment surface including the second compound SEC according to Formula (I) by performing step b1) and/or b2): b1) hydrolyzing one or two of the methyl ester groups —COOR$^4$ and —COOR$^5$ of the color pigment molecules on the pigment surface; b2) adding the second compound SEC according to Formula (I) to the liquid medium including the color pigment.

DEFINITIONS

The term "colorant", as used in the preferred embodiments of the present invention, means dyes and pigments.

The term "dye", as used in the preferred embodiments of the present invention, means a colorant having a solubility of 10 mg/L or more in the medium in which it is applied and under the ambient conditions pertaining.

The term "pigment" is defined in DIN 55943, herein incorporated by reference, as a coloring agent that is practically insoluble in the application medium under the pertaining ambient conditions, hence having a solubility of less than 10 mg/L therein.

The term "mixed crystal", which is synonymous for "solid solution", as used in the preferred embodiments of the present invention, means a solid, homogeneous mixture of two or more constituents, which may vary in composition between certain limits and remain homogeneous. Mixed crystals are also referred to as solid solutions. In a solid solution, the molecules of the components enter into the same crystal lattice, usually, but not always, that of one of the components.

The term "C.I." is used in the preferred embodiments of the present application as an abbreviation for Colour Index.

The term "actinic radiation" as used in the preferred embodiments of the present invention, means electromagnetic radiation capable of initiating photochemical reactions.

The term "spectral separation factor" as used in the preferred embodiments of the present invention means the value obtained by calculating the ratio of the maximum absorbance $A_{max}$ (measured at wavelength $\lambda_{max}$) over the reference absorbance $A_{ref}$ determined at a higher wavelength $\lambda_{ref}$.

The abbreviation "SSF" is used in the preferred embodiments of the present invention for spectral separation factor.

The term "alkyl" means all variants possible for each number of carbon atoms in the alkyl group i.e., for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "carboxyl group" as used in the preferred embodiments of the present invention means the functional group of carboxylic acid, i.e., —COOH. It is also known as carboxy group.

The term "hydrolyzation" as used in the preferred embodiments of the present invention means the conversion of an ester group to a carboxyl group.

Color Pigments

A color pigment such as C.I. Pigment Yellow 120 is usually manufactured by diazotization of an aromatic amine including two methyl ester groups followed by a coupling with 5-acetoacetylamino benzimidazolone. The diazotization of a mixture of an aromatic amine including two methyl ester groups and a small amount of an aromatic amine including at least one carboxyl group followed by the coupling with 5-acetoacetylamino benzimidazolone leads to a mixed crystal wherein most of the compounds including at least one carboxyl group would be located in the bulk of the crystal. In order to obtain a substantial increase in the amount of the compounds including at least one carboxyl group on the pigment surface, it would be necessary to use a mixture including a large amount of an aromatic amine including at least one carboxyl group. However, this would lead to a change in properties of the color pigment, such as reduced weather fastness, solvent fastness and fastness towards an alkaline environment.

A compound including at least one carboxyl group located in the bulk of the mixed crystal is not capable of improving the dispersion quality and stability. It is essential that these compounds are present on the pigment surface in a specific amount. Good dispersion quality and stability was observed for a color pigment containing, based upon the total weight of the pigment, at least 70.0 weight % of a first compound COP according to Formula (I):

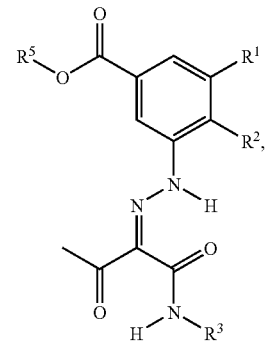

Formula (I)

wherein one of $R^1$ and $R^2$ is hydrogen and the other one of $R^1$ and $R^2$ represents —COOR$^4$; $R^4$ and $R^5$ represent methyl; $R^3$ is selected from the group consisting of:

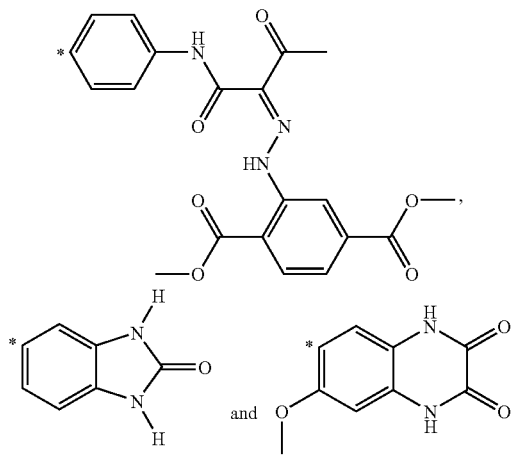

with C* representing the point of attachment of $R^3$ to the nitrogen in Formula (I); and having a pigment surface including between 2.0 and 30.0 weight %, based upon the total weight of the pigment, of a second compound SEC according to Formula (I) wherein $R^1$, $R^2$, $R^3$, $R^4$ and $R^5$ have the same meaning as above with the exception that at least one of $R^4$ and $R^5$ represents hydrogen.

In a preferred embodiment, the second compound SEC according to Formula (I) represents preferably at least 2.5 weight %, more preferably at least 3.0 weight %, more preferably at least 4.0 weight % and most preferably at least 5.0 weight %, all based upon the total weight of the color pigment. The upper limit of the second compound SEC according to Formula (I) represents preferably at most 25.0 weight %, more preferably at most 20.0 weight % and most preferably at most 15.0 weight %, all based upon the total weight of the color pigment The first compound COP according to Formula (I) in the color pigment preferably corresponds with the chemical structure of a color pigment selected from the group consisting of C.I. Pigment Yellow 120, C.I. Pigment Yellow 155, C.I. Pigment Yellow 175 and C.I. Pigment Yellow 213.

In a highly preferred embodiment, the second compound SEC according to Formula (I) is identical to the first compound COP according to Formula (I) with the exception that at least one of $R^4$ and $R^5$ represents hydrogen.

In a preferred embodiment, the color pigment has a second compound SEC according to Formula (I) represented by Formula (I-a):

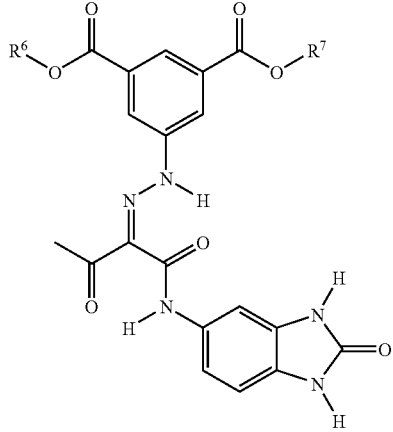

Formula (I-a)

wherein $R^6$ and $R^7$ are independently selected from the group consisting of hydrogen and methyl, with the proviso that at least one of $R^6$ and $R^7$ represents hydrogen, or $R^6$ and $R^7$ both represent hydrogen. Most preferably, the first compound COP according to Formula (I) used with the second compound SEC according to Formula (I-a) has the chemical structure of C.I. Pigment Yellow 120.

In another preferred embodiment, the color pigment has a second compound SEC according to Formula (I) represented by Formula (I-b):

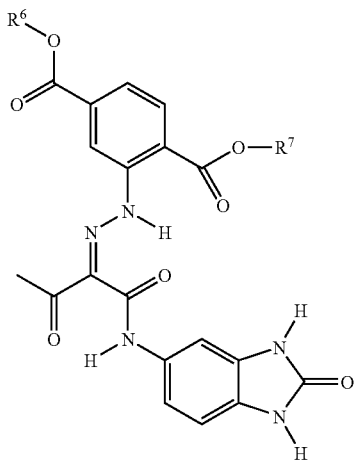

Formula (I-b)

wherein $R^6$ and $R^7$ are independently selected from the group consisting of hydrogen and methyl, with the proviso that at least one of $R^6$ and $R^7$ represents hydrogen, or $R^6$ and $R^7$ both represent hydrogen. Most preferably, the first compound COP according to Formula (I) used with the second compound SEC according to Formula (I-b) has the chemical structure of C.I. Pigment Yellow 175.

In another preferred embodiment, the color pigment has a second compound SEC according to Formula (I) represented by Formula (I-c):

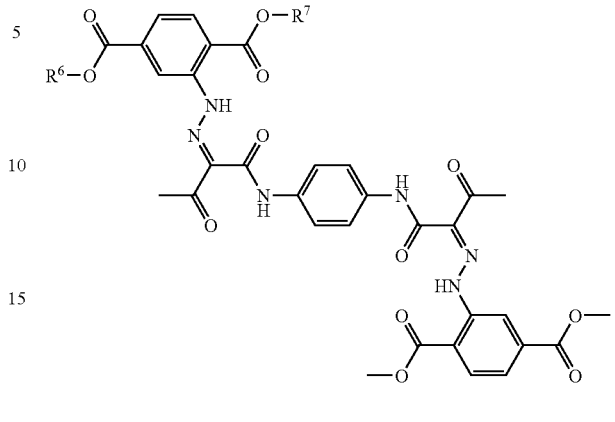

Formula (I-c)

wherein $R^6$ and $R^7$ are independently selected from the group consisting of hydrogen and methyl, with the proviso that at least one of $R^6$ and $R^7$ represents hydrogen, or $R^6$ and $R^7$ both represent hydrogen. Most preferably, the first compound COP according to Formula (I) used with the second compound SEC according to Formula (I-c) has the chemical structure of C.I. Pigment Yellow 155.

In another preferred embodiment, the color pigment has a second compound SEC according to Formula (I) represented by Formula (I-d):

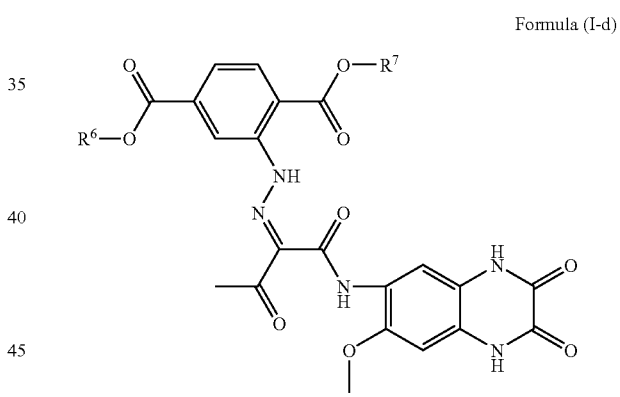

Formula (I-d)

wherein $R^6$ and $R^7$ are independently selected from the group consisting of hydrogen and methyl, with the proviso that at least one of $R^6$ and $R^7$ represents hydrogen, or $R^6$ and $R^7$ both represent hydrogen. Most preferably, the first compound COP according to Formula (I) used with the second compound SEC according to Formula (I-d) has the chemical structure of C.I. Pigment Yellow 213.

It is also possible to use a mixture of two or more second compounds according to Formula (I), such as for example, a mixture of the compounds according to Formula (I-a) including one and two carboxyl groups. Also, a mixture of two or more second compounds according to Formula (I) differing further in chemical structure can be used, such as for example, a mixture of second compounds according to Formula (I-a) and (I-d).

Preparation of Color Pigments

The color pigment according to a preferred embodiment of the present invention can be prepared in a number of ways such as hydrolyzing one or two of the methyl ester groups —COOR$^4$ and —COOR$^5$ of the color pigment molecules on the pigment surface, adding the second compound SEC according to Formula (I) to the liquid medium including the color pigment or a combination of both. In general, it was observed that one methyl ester group of a first compound COP according to Formula (I) located on the pigment surface was hydrolyzed by using a strong acid, such as $H_2SO_4$ or HCl. On the other hand, the use of a strong base, such as NaOH, generally includes the hydrolyzation of two methylester groups of the first compound COP according to Formula (I) on the pigment surface. The hydrolyzation of NaOH is followed by addition of a weak acid, such as acetic acid, to obtain the carboxyl group(s) in the second compound SEC according to Formula (I). The second compound SEC according to Formula (I) can be added in a non-aqueous solution.

Another method is to prepare the second compound SEC according to Formula (I) by synthesis. For example, the second compound SEC according to Formula (I-d) can be prepared by diazotization of an aromatic amine including at least one carboxyl group followed by a coupling reaction with N-(acetoacetyl)-7-amino-6-methoxy-2,3-quinoxalinedione. This second compound SEC according to Formula (I-d) can than simply be added as such, more preferably in the form of a solution, to the liquid medium including the color pigment having a structure according to the first compound COP according to Formula (I), or to the liquid medium including a color pigment having already received a (partial) hydrolyzation treatment.

In a preferred embodiment, the method of preparing a color pigment includes the steps of: a) providing a liquid medium including a color pigment selected from the group consisting of C.I. Pigment Yellow 120, C.I. Pigment Yellow 155, C.I. Pigment Yellow 175 and C.I. Pigment Yellow 213; and b) forming a pigment surface including the second compound SEC according to Formula (I) by performing step b1) and/or b2): b1) hydrolyzing one or two of the methyl ester groups —COOR$^4$ and —COOR$^5$ of the color pigment molecules on the pigment surface; b2) adding the second compound SEC according to Formula (I) to the liquid medium including the color pigment; and c) removing the liquid medium to obtain a dry color pigment.

In a preferred embodiment, the second compound SEC according to Formula (I) added to the liquid medium including the color pigment has a smaller molecular weight than color pigment.

The color pigment used in step a) of the method for preparing the color pigment can be used either in the form of a presscake, preferably an aqueously moist presscake, or in a dried state, in the form of granules or powder, for example. In a preferred embodiment, the color pigment used in step a) is the color pigment obtained directly after synthesis, i.e., which has not been dried yet.

The liquid medium used in the method for preparing the color pigment can be water. In a preferred embodiment, the liquid medium is an aqueous medium. Instead of using an aqueous liquid medium for preparing the color pigment, it is also possible to use a non-aqueous liquid medium. This can be advantageously used when non-aqueous pigment dispersions or non-aqueous inkjet inks have to be prepared afterwards, thus avoiding drying the pigment.

A preferred method of the present invention is preferably carried out in a suspension containing from 1 to 50% by weight, preferably from 2 to 20% by weight, more preferably from 3 to 17.5% by weight of the color pigment, based on the total weight of the suspension. Larger amounts of solvent can be used, but this may become cost prohibitive. In the case of smaller amounts of solvent, the mixture's stirrability may be impaired.

Suitable organic solvents for the finish include alcohols having 1 to 20, especially 1 to 10 carbon atoms, such as methanol, ethanol, n-propanol, isopropanol, butanols, such as n-butanol, isobutanol and tert-butanol, pentanols, such as n-pentanol, and 2-methyl-2-butanol, hexanols, such as 2-methyl-2-pentanol and 3-methyl-3-pentanol, heptanols, such as 2-methyl-2-hexanol and 3-ethyl-3-pentanol, octanols, such as 2,4,4-trimethyl-2-pentanol, cyclohexanol; or glycols, such as ethylene glycol, diethylene glycol, propylene glycol, dipropylene glycol, or glycerol; polyglycols, such as polyethylene glycols or polypropylene glycols; ethers, such as methyl isobutyl ether, tetrahydrofuran, dimethoxyethane or dioxane; glycol ethers, such as monoalkyl ethers of ethylene glycol or of propylene glycol or diethylene glycol monoalkyl ethers, in which alkyl may be methyl, ethyl, propyl, and butyl, butyl glycols or methoxybutanol; polyethylene glycol monomethyl ethers, especially those having a mean molar mass of from 350 to 550 g/mol, and polyethylene glycol dimethyl ethers, especially those having a mean molar mass of from 250 to 500 g/mol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethyl urea; or cyclic carboxamides, such as N-methylpyrrolidone, valerolactam or caprolactam; esters, such as carboxylic acid $C_1$-$C_6$-alkyl esters, such as butyl formate, ethyl acetate or propyl propionate; or carboxylic acid $C_1$-$C_6$-glycol esters; or glycol ether acetates, such as 1-methoxy-2-propyl acetate; or phthalic or benzoic acid $C_1$-$C_6$-alkyl esters, such as ethyl benzoate; cyclic esters, such as caprolactone; nitriles, such as acetonitrile or benzonitrile; aliphatic or aromatic hydrocarbons, such as cyclohexane or benzene; or alkyl-, alkoxy-, nitro- or halo-substituted benzene, such as toluene, xylenes, ethylbenzene, anisole, nitrobenzene, chlorobenzene, o-dichlorobenzene, 1,2,4-trichlorobenzene or bromobenzene; or other substituted aromatics, such as benzoic acid or phenol; aromatic heterocycles, such as pyridine, morpholine, picoline or quinoline; and also hexamethylphosphoramide, 1,3-dimethyl-2-imidazolidinone; sulfones and sulfoxides, such as dimethyl sulfoxide and sulfolane; and also mixtures of these solvents. When making the selection it should be ensured that the solvent is stable under the chosen conditions.

In the case of an aqueous liquid medium, it is advantageous for at least 2.5% by weight, preferably at least 5% by weight and in particular at least 7.5% by weight of the liquid medium to be organic solvent. Particularly preferred solvents are $C_1$-$C_6$ alcohols, especially methanol, ethanol, isopropanol, isobutanol and tert-butanol, tert-amyl alcohol, butyl glycol, dimethylformamide, N,N-dimethylacetamide, N-methylpyrrolidone and dimethyl sulfoxide.

Preference is given to an aqueous liquid medium containing from 2.5 to 95% by weight, preferably from 5 to 90% by weight, and in particular from 7.5 to 75% by weight of organic solvent, based on the total weight of the liquid medium.

In a preferred embodiment, the hydrolyzation is accomplished by using a base. Suitable bases include alkali metal hydroxides, where appropriate in the form of their aqueous solutions, such as sodium hydroxide or potassium hydroxide, or alkali metal alkoxides, where alkali is sodium or potassium in particular and the alkoxide is derived preferably from $C_1$-$C_6$ alcohols, such as, for example, sodium or potassium methoxide, ethoxide, isopropoxide, tert-butoxide and tertpentoxide. The alkali metal alkoxides may also be prepared in situ by reaction of the corresponding alcohol with the alkali metal, alkali metal hydride or alkali metal amide.

The amount of base used may vary within wide ranges as long as the resulting pigment surface includes more than 2.0 weight %, based upon the total weight of the pigment, of a second compound SEC according to Formula (I) and preferably at least 2.5 weight %, more preferably at least 3.0 weight %, more preferably at least 4.0 weight % and most preferably at least 5.0 weight %, all based upon the total weight of the color pigment. Higher temperatures accelerate the hydrolyzation and may reduce the required amount of base or acid. The hydrolization step is carried out preferably at a temperature of from 0 to 250° C., particularly from 15 to 200° C., in particular from 50 to 190° C., for a time of from 5 minutes to 96 hours, particularly from 5 minutes to 48 hours, in particular from 5 minutes to 24 hours, under elevated pressure where appropriate.

In a preferred embodiment, the temperature in the hydrolyzation step is preferably at least 40° C., more preferably 50° C., 70° C., 80° C. or higher.

If the hydrolyzation is carried out at alkaline pH, the pH is lowered again before the pigment is isolated, by adding acid. Suitable acids include organic acids, such as aliphatic or aromatic carboxylic, phosphonic or sulfonic acids, examples being formic acid, acetic acid, propionic acid, butyric acid, hexanoic acid, oxalic acid, citric acid, benzoic acid, phenylacetic acid, benzenesulfonic acid and p-toluenesulfonic acid, and inorganic acids, such as hydrochloric acid, sulfuric acid or phosphoric acid, for example. When using strong acids, the skilled person will know that further hydrolyzation can occur and it is essential that the second compound SEC according to Formula (I) is not present in a concentration higher than 30.0 weight %, more preferably at most 25.0 weight %, still more preferably at most 20.0 weight % and most preferably at most 15.0 weight % all based upon the total weight of the color pigment. Therefore, the addition of strong acids is preferably done in the form of a diluted solution.

The preferred acids for hydrolyzation in the aqueous liquid medium are inorganic acids, such as hydrochloric acid, sulfuric acid and phosphoric acid.

It is also possible to perform hydrolyzation in a non-aqueous liquid medium by using a suitable organic base, such as lithium hydroxide, tetrabutylammoniumhydroxide and other organic hydroxide generators.

Another method of hydrolyzation in a non-aqueous liquid medium includes the addition of a trialkylsilyl halogenide followed by the addition of an alcohol or less preferably a minute amount of water. This can be advantageously exploited in preparing non-aqueous pigment dispersions by using volatile reaction products, such as trimethylsilyl chloride or trimethylsilyl bromide and methanol, which eliminates filtration to remove salts from the non-aqueous pigment dispersion. The hydrolyzation method can be exemplified as follows:

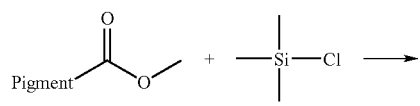

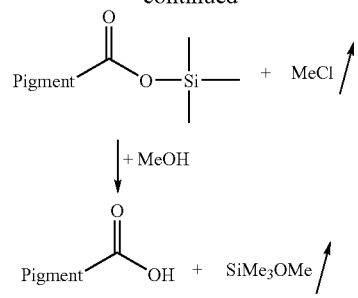

Non-Aqueous Pigment Dispersions

The non-aqueous pigment dispersion includes a color pigment according to a preferred embodiment of the present invention in a non-aqueous liquid medium. The term "non-aqueous liquid medium" refers to a liquid carrier which should contain no water. However, sometimes a small amount, generally less than 5 wt % of water based on the total weight of the pigmented dispersion, can be present. This water is not intentionally added but comes into the formulation via other components as a contamination, such as for example polar organic solvents. Higher amounts of water than 5 wt % tend to make the non-aqueous pigmented dispersions unstable, so preferably the water content is less than 1 wt % based on the total weight dispersion medium and most preferably no water at all is present.

The non-aqueous pigmented dispersion according to a preferred embodiment of the present invention may further also contain at least one surfactant.

In a preferred embodiment, the non-aqueous pigmented dispersion is a non-aqueous inkjet ink. The non-aqueous inkjet ink may contain at least one humectant to prevent the clogging of the nozzle due to its ability to slow down the evaporation rate of ink.

The non-aqueous inkjet ink is preferably an inkjet ink selected from the group consisting of an organic solvent based, an oil based and a curable inkjet ink. The curable inkjet ink is preferably radiation curable.

The viscosity of the inkjet ink is preferably lower than 30 mPa·s, more preferably lower than 15 mPa·s, and most preferably between 2 and 10 mPa·s at a shear rate of $100\ s^{-1}$ and a jetting temperature between 10 and 70° C.

The curable inkjet ink may contain as a dispersion medium monomers, oligomers and/or prepolymers possessing different degrees of functionality. A mixture including combinations of mono-, di-, tri- and/or higher functionality monomers, oligomers or prepolymers may be used. A catalyst called an initiator for initiating the polymerization reaction may be included in the curable inkjet ink. The initiator can be a thermal initiator, but is preferably a photo-initiator. The photo-initiator requires less energy to activate than the monomers, oligomers and/or prepolymers to form the polymer. The photo-initiator suitable for use in the curable pigment dispersion may be a Norrish type I initiator, a Norrish type II initiator or a photo-acid generator.

The non-aqueous inkjet ink forms preferably part of a non-aqueous CMYK inkjet ink set. The non-aqueous CMYK inkjet ink set may also be extended with extra inks such as red, green, blue, and/or orange to further enlarge the color gamut of the image. The CMYK ink set may also be extended by the combination of full density and light density inks of both color inks and/or black inks to improve the image quality by lowered graininess.

Pigment particles in inkjet ink should be sufficiently small to permit free flow of the ink through the inkjet-printing device, especially at the ejecting nozzles. It is also desirable to use small particles for maximum color strength and to slow down sedimentation.

The average pigment particle size is preferably between 0.050 and 1 µm, more preferably between 0.070 and 0.300 µm and particularly preferably between 0.080 and 0.200 µm. Most preferably, the average pigment particle size is no larger than 0.150 µm.

In a preferred embodiment, the non-aqueous pigment dispersion includes pigment particles in accordance with the present invention wherein the average particle size determined by photon correlation spectroscopy at a wavelength of 633 nm with a 4 mW HeNe laser on a diluted sample is less than 175 nm.

The pigment is preferably used in the inkjet ink in an amount of 0.1 to 20 wt %, preferably 1 to 10 wt % based on the total weight of the inkjet ink.

In a particularly preferred embodiment, the non-aqueous pigment dispersion is a radiation curable inkjet ink.

Preparation of Pigment Dispersions and Inks

The non-aqueous pigment dispersions and inkjet inks according to the various preferred embodiments of the present invention can be prepared in several ways.

In a first preferred embodiment, the non-aqueous pigment dispersions and inkjet inks may be prepared by milling the dry pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g., beads consisting essentially of a polymeric resin or yttrium stabilized zirconium oxide beads.

In the process of mixing, milling and dispersion, each process is performed with cooling to prevent build up of heat, and for radiation curable inkjet inks as much as possible under light conditions in which actinic radiation has been substantially excluded.

The inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In a preferred embodiment of the present invention, pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g., for a bead mill. The milled pigment concentrate is preferably separated from the milling media by filtration.

In general, it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, color, hue, saturation density, and print area coverage for the particular application.

In another preferred embodiment, the non-aqueous pigment dispersions and inkjet inks are prepared by a method including the steps of: a) providing a non-aqueous liquid medium including a color pigment selected from the group consisting of C.I. Pigment Yellow 120, C.I. Pigment Yellow 155, C.I. Pigment Yellow 175 and C.I. Pigment Yellow 213; and b) forming a pigment surface including the second compound SEC according to Formula (I) by performing step b1) and/or b2): b1) hydrolyzing one or two of the methyl ester groups —COOR$^4$ and —COOR$^5$ of the color pigment molecules on the pigment surface; b2) adding the second compound SEC according to Formula (I) to the liquid medium including the color pigment. It is possible to remove or replace a portion of the non-aqueous liquid medium by other liquid media such as solvents, oils, monomers and oligomers or a combination thereof.

In a preferred embodiment, the second compound SEC according to Formula (I) added to the liquid medium including the color pigment has a smaller molecular weight than the color pigment.

The method including in-situ hydrolyzation and/or addition of a second compound SEC according to Formula (I) is usually also accompanied by a dispersing treatment, such as milling and/or ultrasonic energy. The same dispersing techniques as described above for the first preferred embodiment can be applied here.

Dispersants

Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

statistically polymerized monomers (e.g., monomers A and B polymerized into ABBAABAB);

alternating polymerized monomers (e.g., monomers A and B polymerized into ABABABAB);

gradient (tapered) polymerized monomers (e.g., monomers A and B polymerized into AAABAABBABBB);

block copolymers (e.g., monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with side chains attached to the backbone); and mixed forms of these polymers, e.g., blocky gradient copolymers.

Polymeric dispersants may have different polymer architectures including linear, comb/branched, star, dendritic (including dendrimers and hyperbranched polymers). A general review on the architecture of polymers is given by ODIAN, George, Principles Of Polymerization, 4th Edition, Wiley-Interscience, 2004, pp. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multi-step synthesis), while hyperbranched polymers have a plurality of branch points and multifunctional branches that lead to further branching with polymer growth (one-step polymerization process).

Suitable polymeric dispersants may be prepared via addition or condensation type polymerizations. Polymerization methods include those described by ODIAN, George, Principles Of Polymerization, 4th Edition, Wiley-Interscience, 2004, pp. 39-606.

Addition polymerization methods include free radical polymerization (FRP) and controlled polymerization techniques. Suitable controlled radical polymerization methods include:

RAFT: reversible addition-fragmentation chain transfer;
ATRP: atom transfer radical polymerization
MADIX: reversible addition-fragmentation chain transfer process, using a transfer active xanthate;
Catalytic chain transfer (e.g., using cobalt complexes); and
Nitroxide (e.g., TEMPO) mediated polymerizations;
Other suitable controlled polymerization methods include:
GTP: group transfer polymerization;
Living cationic (ring-opening) polymerizations;
Anionic co-ordination insertion ring-opening polymerization; and
Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN J. F. et al., Facile Synthesis of Comb, Star, and Graft Polymers Via Reversible Addition-fragmentation Chain Transfer (RAFT) Polymerization, Journal of Polymer Science, Part A: Polymer Chemistry, Vol. 40, pp. 2956-2966, 2002.

Group transfer polymerization (GTP): the method of GTP used for synthesis of AB block copolymers is disclosed by SPINELLI, Harry J., GTP and Its Use in Water Based Pigment Dispersants and Emulsion Stabilisers, Proc. of 20th Int. Conf. Org. Coat. Sci. Technol., New Platz, N.Y., State Univ. N.Y., Inst. Mater. Sci. pp. 511-518.

The synthesis of dendritic polymers is described in the literature. The synthesis of dendrimers in NEWCOME, G. R., et al. Dendritic Molecules Concepts, Synthesis, Perspectives, VCH: WEINHEIM, 2001. Hyperbranching polymerization is described by BURCHARD, W., Solution Properties of Branched Macromolecules, *Advances in Polymer Science*, 1999, Vol. 143, No. II, pp. 113-194. Hyperbranched materials can be obtained by polyfunctional polycondensation as disclosed by FLORY, P. J., Molecular Size Distribution in Three-dimensional Polymers, VI. Branched Polymer Containing A-R-Bf-1-type Units, *Journal of the American Chemical Society*, 1952, Vol. 74, pp. 2718-2723.

Living cationic polymerizations, is e.g., used for the synthesis of polyvinyl ethers as disclosed in WO 2005/012444 (CANON), U.S. 2005/0197424 (CANON) and U.S. 2005/0176846 (CANON). Anionic co-ordination ring-opening polymerization is, e.g., used for the synthesis of polyesters based on lactones. Living anionic ring-opening polymerization is, e.g., used for the synthesis of polyethylene oxide macromonomers.

Free Radical Polymerization (FRP) proceeds via a chain mechanism, which basically includes four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by combination).

Polymeric dispersants having several of the above polymer compositions are disclosed in U.S. Pat. No. 6,022,908 (HP), U.S. Pat. No. 5,302,197 (DU PONT) and U.S. Pat. No. 6,528,557 (XEROX).

Suitable statistical copolymeric dispersants are disclosed in U.S. Pat. No. 5,648,405 (DU PONT), U.S. Pat. No. 6,245,832 (FUJI XEROX), U.S. Pat. No. 6,262,207 (3M), U.S. 2005/0004262 (KAO) and U.S. Pat. No. 6,852,777 (KAO).

Suitable alternating copolymeric dispersants are described in U.S. 2003/0017271 (AKZO NOBEL).

Suitable block copolymeric dispersants have been described in numerous patents, especially block copolymeric dispersants containing hydrophobic and hydrophilic blocks. For example, U.S. Pat. No. 5,859,113 (DU PONT) AB block copolymers and U.S. Pat. No. 6,413,306 (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK) and U.S. Pat. No. 6,521,715 (DU PONT).

Suitable branched copolymeric dispersants are described U.S. Pat. No. 6,005,023 (DU PONT), U.S. Pat. No. 6,031,019 (KAO), and U.S. Pat. No. 6,127,453 (KODAK).

Suitable dendritic copolymeric dispersants are described in, e.g., U.S. Pat. No. 6,518,370 (3M), U.S. 2004/0102541 (LEXMARK), WO 00/063305 (GEM GRAVURE), U.S. Pat. No. 6,649,138 (QUANTUM DOT), U.S. 2002/0256230 (BASF), EP 1351759 A (EFKA ADDITIVES) and EP 1295919 A (KODAK).

Suitable designs of polymeric dispersants for inkjet inks are disclosed in SPINELLI, Harry J., Polymeric Dispersants in Inkjet technology, *Advanced Materials*, 1998, Vol. 10, No. 15, pp. 1215-1218.

The monomers and/or oligomers used to prepare the polymeric dispersant can be any monomer and/or oligomer found in the Polymer Handbook Vol. 1+2, 4th Edition, edited by J. BRANDRUP et al., Wiley-Interscience, 1999.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable examples of monomers for synthesising polymeric dispersants include: acrylic acid, methacrylic acid, maleic acid (or there salts), maleic anhydride, alkyl(meth) acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth) acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g., oxiranes, amino, fluoro, polyethylene oxide, phosphate substituted) such as glycidyl(meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrene sulfonic acid; (meth)acrylonitrile; (meth)acrylamides (including N-mono and N,N-disubstituted) such as N-benzyl(meth) acrylamide; maleimides such as N-phenyl maleimide; vinyl derivatives such as vinyl alcohol, vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate. Typical condensation type polymers include polyurethanes, polyamides, polycarbonates, polyethers, polyureas, polyimines, polyimides, polyketones, polyester, polysiloxane, phenol-formaldehyde, urea-formaldehyde, melamine-formaldehyde, polysulfide, polyacetal or combinations thereof.

Suitable copolymeric dispersants are acrylic acid/acrylonitrile copolymer, vinyl acetate/acrylic ester copolymer, acrylic acid/acrylic ester copolymer, styrene/acrylic acid copolymer, styrene/methacrylic acid copolymer, styrene/methacrylic acid/acrylic ester copolymer, styrene/α-methylstyrene/ acrylic acid copolymer, styrene/α-methylstyrene/acrylic acid/acrylic ester copolymer, styrene/maleic acid copolymer, styrene/maleic anhydride copolymer, vinylnaphthalene/ acrylic acid copolymer, vinylnapthalene/maleic acid copolymer, vinyl acetate/ethylene copolymer, vinyl acetate/fatty acid/ethylene copolymer, vinyl acetate/maleic ester copolymer, vinyl acetate/crotonic acid copolymer, vinyl acetate/ acrylic acid copolymer.

Suitable chemistries of copolymeric dispersants also include:

Copolymers which are the product of a condensation process of poly(ethylene imine) with a carboxylic acid terminated polyester (made by addition polymerization); and Copolymers which are the product of a reaction of a multifunctional isocyanate with:
  a compound monosubstituted with a group that is capable of reacting with an isocyanate, e.g., polyester;
  a compound containing two groups capable of reacting with an isocyanate (cross-linker); or
  a compound with at least one basic ring nitrogen and a group that is capable of reacting with an isocyanate group.

A detailed list of suitable polymeric dispersants is disclosed by MC CUTCHEON, Functional Materials, North American Edition, Glen Rock, N.J.: Manufacturing Confectioner Publishing Co., 1990, pp. 110-129.

Suitable pigment stabilizers are also disclosed in DE 19636382 (BAYER), U.S. Pat. No. 5,713,993 (DU PONT), and WO 96/12772 (XAAR).

One polymeric dispersant or a mixture of two or more polymeric dispersants may be present to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant preferably has a polymerization degree DP between 5 and 1,000, more preferably between 10 and 500 and most preferably between 10 and 100.

The polymeric dispersant preferably has a number average molecular weight Mn between 500 and 30,000, more preferably between 1,500 and 10,000.

The polymeric dispersant preferably has an average molecular weight Mw smaller than 100,000, more preferably smaller than 50,000 and most preferably smaller than 30,000.

The polymeric dispersant preferably has a polymeric dispersity PD smaller than 2, more preferably smaller than 1.75 and most preferably smaller than 1.5.

Commercial examples of polymeric dispersants are the following:
  DISPERBYK™ dispersants available from BYK CHEMIE GMBH;
  SOLSPERSE™ dispersants available from NOVEON;
  TEGO™ DISPERS™ dispersants from DEGUSSA;
  EDAPLAN™ dispersants from MÜNZING CHEMIE;
  ETHACRYL™ dispersants from LYONDELL;
  GANEX™ dispersants from ISP;
  DISPEX™ and EFKA™ dispersants from CIBA SPECIALTY CHEMICALS INC;
  DISPONER™ dispersants from DEUCHEM; and
  JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH.

Particularly preferred dispersants for solvent based pigmented dispersions are Solsperse™ 32000 and 39000 from NOVEON.

Particularly preferred dispersants for oil based pigmented dispersions are Solsperse™ 11000, 11200, 13940, 16000, 17000 and 19000 from NOVEON.

Particularly preferred dispersants for UV-curable pigmented dispersions are Solsperse™ 32000 and 39000 dispersants from NOVEON.

The polymeric dispersant is preferably used in an amount of 2 to 600 wt %, more preferably 5 to 200 wt % based on the weight of the pigment.

Binders

Non-aqueous inkjet ink compositions preferably include a binder resin. The binder functions as a viscosity controlling agent and also provides fixability relative to the polymeric resin substrate, e.g., a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstyrene copolymer resin. These binders may be used alone or in a mixture thereof. The binder is preferably a film-forming thermoplastic resin.

The amount of binder resin in inkjet ink is preferably in the range of 0.1 to 30 wt %, more preferably 1 to 20 wt %, most preferably 2 to 10 wt % based on the total weight of the inkjet ink.

Dispersion Media

In one preferred embodiment, the dispersion medium includes organic solvent(s). Suitable organic solvents include alcohols, ketones, esters, ethers, glycols and polyglycols and derivatives thereof, lactones, N-containing solvents such as amides. Preferably, mixtures of one or more of these solvents are used.

Examples of suitable alcohols include methyl alcohol, ethyl alcohol, n-propyl alcohol, isopropyl alcohol, n-butyl alcohol, heptyl alcohol, octyl alcohol, cyclohexyl alcohol, benzyl alcohol, phenylethyl alcohol, phenylpropyl alcohol, furfuryl alcohol, anise alcohol and fluoroalcohols.

Examples of suitable ketones include acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone and isophorone, 2,4-pentanedione and hexafluoroacetone.

Examples of suitable esters include methyl acetate, ethyl acetate, n-propyl acetate, isopropyl acetate, n-butyl acetate, isobutyl acetate, hexyl acetate, octyl acetate, benzyl acetate, phenoxyethyl acetate, ethyl phenyl acetate, methyl lactate, ethyl lactate, propyl lactate, butyl lactate; methyl propionate, ethyl propionate, benzyl propionate, ethylene carbonate, propylene carbonate, amyl acetate, ethyl benzoate, butyl benzoate, butyl laurate, isopropyl myristate, isopropyl palmirate, triethyl phosphate, tributyl phosphate, diethyl phthalate, dibutyl phthalate, diethyl malonate, dipropyl malonate, diethyl succinate, dibutyl succinate, diethyl glutarate, diethyl adipate, dibutyl adipate and diethyl sebacate.

Examples of suitable ethers include butyl phenyl ether, benzyl ethyl ether, hexyl ether, diethyl ether, dipropyl ether, tetrahydrofuran and dioxane.

Examples of suitable glycols and polyglycols include ethylene glycol, diethylene glycol, triethylene glycol, propylene glycol, dipropylene glycol and tripropylene glycol.

Examples of suitable glycol and polyglycol derivatives include ethers such as alkylene glycol mono alkyl ethers, alkylene glycol dialkyl ethers, polyalkylene glycol monoalkyl ethers, polyalkylene glycol dialkyl ethers and esters of the preceding glycol ethers such as acetate and propionate esters, in case of dialkyl ethers only one ether function (resulting in mixed ether/ester) or both ether functions can be esterized (resulting in dialkyl ester).

Examples of suitable alkylene glycol mono alkyl ethers include ethylene glycol mono methyl ether, ethylene glycol mono ethyl ether, ethylene glycol mono propyl ether, ethylene glycol mono butyl ether, ethylene glycol mono hexyl ether, ethylene glycol mono 2-ethyl-hexyl ether, ethylene glycol mono phenyl ether, propylene glycol mono methyl ether, propylene glycol mono ethyl ether, propylene glycol mono n-propyl ether, propylene glycol mono n-butyl ether, propylene glycol mono iso-butyl ether, propylene glycol mono t-butyl ether and propylene glycol mono phenyl ether.

Examples of suitable alkylene glycol dialkyl ethers include ethylene glycol dimethyl ether, ethylene glycol diethyl ether, ethylene glycol methyl ethyl ether, ethylene glycol dibutyl ether, propylene glycol dimethyl ether, propylene glycol diethyl ether and propylene glycol dibutyl ether.

Examples of suitable polyalkylene glycol mono alkyl ethers include diethylene glycol mono methyl ether, diethylene glycol mono ethyl ether, diethylene glycol mono-n-propyl ether, diethylene glycol mono n-butyl ether, diethylene glycol mono hexyl ether, triethylene glycol mono methyl ether, triethylene mono ethyl ether, triethylene glycol mono butyl ether, dipropylene mono methyl ether, dipropylene glycol mono ethyl ether, dipropylene glycol n-propyl ether, dipropylene glycol mono n-butyl ether, dipropylene mono t-butyl ether, tripropylene glycol mono methyl ether, tripropylene glycol mono ethyl ether, tripropylene glycol mono n-propyl ether and tripropylene glycol mono n-butyl ether.

Examples of suitable polyalkylene glycol dialkyl ethers include diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methyl ethyl ether, triethylene glycol methyl ethyl ether, tetraethylene glycol methyl ethyl ether, diethylene glycol di-n-propyl ether, diethylene glycol di-iso-propyl ether, dipropylene glycol dimethyl ether, dipropylene glycol diethyl ether, dipropylene di n-propyl ether, dipropylene di t-butyl ether, tripropylene glycol dimethyl ether and tripropylene glycol diethyl ether.

Examples of suitable glycol esters include ethylene glycol monomethyl ether acetate, ethylene glycol monoethyl ether acetate, ethylene glycol monopropyl ether acetate, ethylene glycol monobutyl ether acetate, diethylene glycol monoethyl ether acetate, diethylene glycol monobutyl ether acetate, propylene glycol monomethyl ether acetate, propylene glycol monoethyl ether acetate, dipropylene glycol monomethyl ether acetate and propylene glycol monomethyl ether propionate.

Preferred solvents for use in the pigment dispersion and inkjet inks according to preferred embodiments of the present invention are one or more polyalkyleneglycol dialkylethers represented by the formula (PAG)

Formula (PAG)

wherein, $R_1$ and $R_2$ are each independently selected from an alkyl group having 1 to 4 carbon atoms;

Y represents an ethylene group and/or a propylene group; wherein n is an integer selected from 4 to 20 for a first polyalkyleneglycol dialkylether; and n is an integer selected from 5 to 20 for a second polyalkyleneglycol.

The alkyl groups $R_1$ and $R_2$ of the polyalkyleneglycol dialkylethers according to Formula (PAG) preferably represent methyl and/or ethyl. Most preferably, the alkyl groups $R_1$ and $R_2$ are both methyl groups.

In a preferred embodiment, the polyalkyleneglycol dialkylethers according to Formula (PAG) are polyethylene glycol dialkylethers.

In another preferred embodiment, a mixture of 2, 3, 4 or more polyalkyleneglycol dialkylethers, more preferably polyethylene glycol dialkylethers are present in the pigment dispersion or inkjet ink.

Suitable mixtures of polyalkyleneglycol dialkylethers for the pigment dispersions include mixtures of polyethylene glycol dimethyl ethers having a molecular weight of at least 200, such as Polyglycol DME 200™, Polyglycol DME 250™ and Polyglycol DME 500™ from CLARIANT. The polyalkyleneglycol dialkylethers used in non-aqueous inkjet inks preferably have an average molecular weight between 200 and 800, and more preferably no polyalkyleneglycol dialkylethers with a molecular weight of more than 800 are present. The mixture of polyalkyleneglycol dialkylethers is preferably a homogeneous liquid mixture at room temperature.

Suitable commercial glycol ether solvents include Cellosolve™ solvents and Carbitol™ solvents from UNION CARBIDE, Ektasolve™ solvents from EASTMAN, Dowanol™ solvents from DOW, Oxitoll™ solvents, Dioxitoll™ solvents, Proxitoll™ solvents and Diproxitoll™ solvents from SHELL CHEMICAL and Arcosolv™ solvents from LYONDELL.

Lactones are compounds having a ring structure formed by ester bonds and can be of the γ-lactone (5-membered ring structure), δ-lactone (6-membered ring structure) or ε-lactone (7-membered ring structure) types. Suitable examples of lactones include γ-butyrolactone, γ-valerolactone, γ-hexylactone, γ-heptalactone, γ-octalactone, γ-nonalactone, γ-decalactone, γ-undecalactone, δ-valerolactone, δ-hexylactone, δ-heptalactone, δ-octalactone, δ-nonalactone, δ-decalactone, δ-undecalactone and ε-caprolactone.

Suitable examples of N-containing organic solvents include 2-pyrrolidone, N-methylpyrrolidone, N,N-dimethylacetamid, N,N-dimethylformamid, acetonitril and N,N-dimethyldodecanamide.

In another preferred embodiment, the dispersion medium includes oil types of liquids, alone or in combination with organic solvent(s). Suitable organic solvents include alcohols, ketones, esters, ethers, glycols and polyglycols and derivatives thereof, lactones, N-containing solvents such as amides, higher fatty acid ester and mixtures of one or more of the solvents as described above for solvent based dispersion media.

The amount of polar solvent is preferably lower than the amount of oil. The organic solvent preferably has a high boiling point, preferably above 200° C. Examples of suitable combinations are disclosed by GB 2303376 (FUJITSU ISOTEC) especially for the use of oleyl alcohol and EP 1157070 A (MARCONI DATA SYSTEMS) for the combination of oil and volatile organic solvent.

Suitable oils include saturated hydrocarbons and unsaturated hydrocarbons, aromatic oils, paraffinic oils, extracted paraffinic oils, napthenic oils, extracted napthenic oils, hydrotreated light or heavy oils, vegetable oils, white oils, petroleum naphtha oils, halogen-substituted hydrocarbons, silicones and derivatives and mixtures thereof.

Hydrocarbons may be selected from straight chain or branched chain aliphatic hydrocarbons, alicyclic hydrocarbons and aromatic hydrocarbons. Examples of hydrocarbons are saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,3,5,7-cyclooctatetraene; and cyclododecene; and aromatic hydrocarbons such as benzene, toluene, xylene, naphthalene, phenanthrene, anthracene and derivatives thereof. In literature, the term paraffinic oil is often used. Suitable paraffinic oils can be normal paraffin type (octane and higher alkanes), isoparaffins (isooctane and higher isoalkanes) and cycloparaffins (cyclooctane and higher cycloalkanes) and mixtures of paraffin oils. The term "liquid paraffin" is often used to refer to a mixture of mainly including three components of a normal paraffin, an isoparaffin and a monocyclic paraffin, which is obtained by highly refining a relatively volatile lubricating oil fraction through a sulphuric-acid washing or the like, as described in U.S. Pat. No. 6,730,153 (SAKATA INX). Suitable hydrocarbons are also described as de-aromatized petroleum distillates.

Suitable examples of halogenated hydrocarbons include methylene dichloride, chloroform, tetrachloromethane and methyl chloroform. Other suitable examples of halogen-substituted hydrocarbons include perfluoro-alkanes, fluorine-based inert liquids and fluorocarbon iodides.

Suitable examples of silicone oils include dialkyl polysiloxane (e.g., hexamethyl disiloxane, tetramethyl disiloxane, octamethyl trisiloxane, hexamethyl trisiloxane, heptamethyl trisiloxane, decamethyl tetrasiloxane, trifluoropropyl heptamethyl trisiloxane, diethyl tetramethyl disiloxane), cyclic dialkyl polysiloxane (e.g., hexamethyl cyclotrisiloxane, octamethyl cyclotetrasiloxane, tetramethyl cyclotetrasiloxane, tetra(trifluoropropyl)tetramethyl cyclotetrasiloxane), and methylphenyl silicone oil.

White oil is a term used for white mineral oils, which are highly refined mineral oils that consist of saturated aliphatic and alicyclic non-polar hydrocarbons. White oils are hydrophobic, colorless, tasteless, odourless, and do not change color over time.

Vegetable oils include semi-drying oils such as soybean oil, cotton seed oil, sunflower oil, rape seed oil, mustard oil, sesame oil and corn oil; non-drying oils such as olive oil, peanut oil and tsubaki oil; and drying oils such as linseed oil and safflower oil, wherein these vegetable oils can be used alone or as a mixture thereof.

Examples of other suitable oils include petroleum oils, non-drying oils and semi-drying oils.

Commercially available suitable oils include the aliphatic hydrocarbons types such as the Isopar™ range (isoparaffins) and Varsol/Naphtha range from EXXON CHEMICAL, the Soltrol™ range and hydrocarbons from CHEVRON PHILLIPS CHEMICAL, and the Shellsol™ range from SHELL CHEMICALS.

Suitable commercial normal paraffins include the Norpar™ range from EXXON MOBIL CHEMICAL.

Suitable commercial napthenic hydrocarbons include the Nappar™ range from EXXON MOBIL CHEMICAL.

Suitable commercial de-aromatized petroleum distillates include the Exxsol™ D types from EXXON MOBIL CHEMICAL Suitable commercial fluoro-substituted hydrocarbons include fluorocarbons from DAIKIN INDUSTRIES LTD, Chemical Division.

Suitable commercial silicone oils include the silicone fluid ranges from SHIN-ETSU CHEMICAL, Silicone Division.

Suitable commercial white oils include Witco™ white oils from CROMPTON CORPORATION.

If the non-aqueous pigment dispersion is a curable pigment dispersion, the dispersion medium includes one or more monomers and/or oligomers to obtain a liquid dispersion medium. Sometimes, it can be advantageous to add a small amount of an organic solvent to improve the dissolution of the dispersant. The content of organic solvent should be lower than 20 wt % based on the total weight of the inkjet ink. In other cases, it can be advantageous to add a small amount of water, for example, to improve the spreading of the inkjet ink on a hydrophilic surface, but preferably the inkjet ink contains no water.

Preferred organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

In the case of a curable inkjet ink, the dispersion medium preferably includes monomers and/or oligomers.

Monomers and Oligomers

Any monomer or oligomer may be used as curable compound for the curable inkjet ink. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the inkjet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however, it is expensive and slow, especially under conditions of high relative humidity. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred for use as a radiation curable compound in the radiation curable inkjet ink are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethyl-ene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, vinyl ether ethoxy (meth)acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaerythritol tetraacrylate, methoxylated glycol acrylates and acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, β-methylstyrene, p-methyl-β-methylstyrene, α-methylstyrene and p-methoxy-β-methylstyrene.

Suitable examples of vinylnaphthalene compounds are 1-vinylnaphthalene, α-methyl-1-vinylnaphthalene, β-methyl-1-vinylnaphthalene, 4-methyl-1-vinylnaphthalene and 4-methoxy-1-vinylnaphthalene.

Suitable examples of N-vinyl heterocyclic compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

The cationically polymerizable compound of the inkjet ink can be one or more monomers, one or more oligomers or a combination thereof.

Suitable examples of cationically curable compounds can be found in Advances in Polymer Science, 62, pages 1 to 47 (1984) by J. V. Crivello.

The cationic curable compound may contain at least one olefin, thioether, acetal, thioxane, thietane, aziridine, N-, O-, S- or P-heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

The cationically polymerizable monomer can be mono-, di- or multi-functional or a mixture thereof.

Suitable cationic curable compounds having at least one epoxy group are listed in the "Handbook of Epoxy Resins" by Lee and Neville, McGraw Hill Book Company, New York (1967) and in "Epoxy Resin Technology" by P. F. Bruins, John Wiley and Sons New York (1968).

Examples of cationic curable compounds having at least one epoxy group include 1,4-butanediol diglycidyl ether, 3-(bis(glycidyloxymethyl)methoxy)-1,2-propane diol, limonene oxide, 2-biphenyl glycidyl ether, 3,4-epoxycyclohexylmethyl-3',4'-epoxycyclohexane carboxylate, epichlorohydrin-bisphenol S based epoxides, epoxidized styrenics and more epichlorohydrin-bisphenol F and A based epoxides and epoxidized novolaks.

Suitable epoxy compounds including at least two epoxy groups in the molecule are alicyclic polyepoxide, polyglycidyl ester of polybasic acid, polyglycidyl ether of polyol, polyglycidyl ether of polyoxyalkylene glycol, polyglycidyl ester of aromatic polyol, polyglycidyl ether of aromatic polyol, urethane polyepoxy compound, and polyepoxy polybutadiene.

Examples of cycloaliphatic bisepoxides include copolymers of epoxides and hydroxyl components such as glycols, polyols, or vinyl ether, such as 3,4-epoxycyclohexylmethyl-3', 4'-epoxycyclohexylcarboxylate; bis(3,4-epoxycylohexylmethyl) adipate; limonene bisepoxide; diglycidyl ester of hexahydrophthalic acid.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, α-methylphenyl vinyl ether, β-methylisobutyl vinyl ether and β-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexylmethyl benzoate, bis[4-(vinyloxy)butyl]isophthalate, bis[4-(vinyloxymethyl)cyclohexylmethyl]glutarate, tris[4-(vinyloxy)butyl]trimellitate, 4-(vinyloxy)butyl steatite, bis [4-(vinyloxy)butyl]hexanediylbiscarbamate, bis[4-(vinyloxy)methyl]cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl](methylenedi-4,1-phenylene) biscarbamate and 3-amino-1-propanol vinyl ether.

Suitable examples of oxetane compounds having at least one oxetane group include 3-ethyl-3-hydroloxymethyl-1-oxetane, the oligomeric mixture 1,4-bis[3-ethyl-3-oxetanyl methoxy)methyl]benzene, 3-ethyl-3-phenoxymethyl-oxetane, bis([1-ethyl(3-oxetanil)]methyl)ether, 3-ethyl-3-[(2-ethylhexyloxy)methyl]oxetane, 3-ethyl-[(tri-ethoxysilyl propoxy)methyl]oxetane and 3,3-dimethyl-2(p-methoxyphenyl)-oxetane.

A preferred class of monomers and oligomers which can be used in both radiation and cationically curable compositions are vinyl ether acrylates such as those described in U.S. Pat. No. 6,310,115 (AGFA), incorporated herein by reference. Particularly preferred compounds are 2-(2-vinyloxyethoxy) ethyl (meth)acrylate, most preferably the compound is 2-(2-vinyloxyethoxy)ethyl acrylate.

Initiators

The curable inkjet ink preferably also contains an initiator. The initiator typically initiates the polymerization reaction. The initiator can be a thermal initiator, but is preferably a photo-initiator. The photo-initiator requires less energy to activate than the monomers, oligomers and/or prepolymers to form the polymer. The photo-initiator suitable for use in the curable inkjet inks may be a Norrish type I initiator, a Norrish type II initiator or a photo-acid generator.

Thermal initiator(s) suitable for use in the curable inkjet ink include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl) benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

The photo-initiator or photo-initiator system absorbs light and is responsible for the production of initiating species, such as free radicals and cations. Free radicals and cations are high-energy species that induce polymerization of monomers, oligomers and polymers and with polyfunctional monomers and oligomers thereby also inducing cross-linking.

Irradiation with actinic radiation may be achieved in two steps by changing wavelength or intensity. In such cases it is preferred to use 2 types of photo-initiators together.

A combination of different types of initiators, for example, a photo-initiator and a thermal initiator can also be used.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-halophenylglyoxalates.

A preferred Norrish type II-initiator is selected from the group consisting of benzophenones, thioxanthones, 1,2-diketones and anthraquinones. A preferred co-initiator is selected from the group consisting of an aliphatic amine, an aromatic amine and a thiol. Tertiary amines, heterocyclic thiols and 4-dialkylamino-benzoic acid are particularly preferred as co-initiator.

Suitable photo-initiators are disclosed in CRIVELLO, J. V., et al., VOLUME III: Photoinitiators for Free Radical Cationic and Anionic Photopolymerization, 2nd Edition, edited by BRADLEY, G., London, UK: John Wiley and Sons Ltd, 1998, pp. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™

1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

Suitable cationic photo-initiators include compounds, which form aprotic acids or Bronsted acids upon exposure to ultraviolet and/or visible light sufficient to initiate polymerization. The photo-initiator used may be a single compound, a mixture of two or more active compounds, or a combination of two or more different compounds, i.e., co-initiators. Non-limiting examples of suitable cationic photo-initiators are aryldiazonium salts, diaryliodonium salts, triarylsulphonium salts, triarylselenonium salts and the like.

The curable inkjet ink may contain a photo-initiator system containing one or more photo-initiators and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable inkjet ink.

In order to increase the photosensitivity further, the curable inkjet ink may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable inkjet ink.

A preferred initiator system is 2,2'-bis(o-chlorophenyl)-4, 4',5,5'-tetraphenyl-(7CI, 8CI) 4,4'-Bi-4H-imidazole corresponding to the chemical formula:

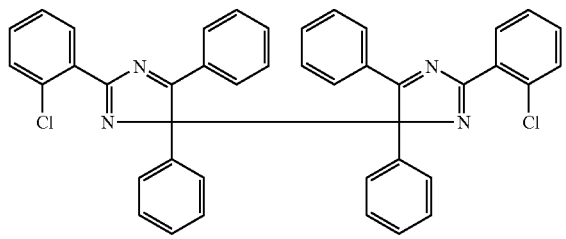

in the presence of a co-initiator such as 2-mercapto benzoxazole.

Another preferred type of initiator is an oxime ester. A suitable example has as the chemical formula:

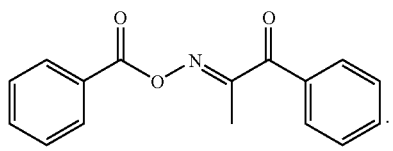

A preferred amount of initiator is 0.3-50 wt % of the total weight of the curable liquid, and more preferably 1-15 wt % of the total weight of the curable inkjet ink.

Irradiation with actinic radiation may be achieved in two steps by changing wavelength or intensity. In such cases it is preferred to use 2 types of photo-initiator together.

Inhibitors

The radiation curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total ink.

Surfactants

The inkjet ink may contain at least one surfactant. The surfactant(s) can be anionic, cationic, non-ionic, or zwitterionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks, preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink, a fluorinated or silicone compound may be used as a surfactant, preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol. The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Spectral Separation Factor

The spectral separation factor SSF was found to be an excellent measure to characterize a pigmented inkjet ink, as it takes into account properties related to light-absorption (e.g., wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of, e.g., a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $A_{max}$ over the absorbance $A_{ref}$ at a reference wavelength.

$$SSF = \frac{A_{max}}{A_{ref}}$$

The SSF is an excellent tool to design inkjet ink sets with a large color gamut. Often inkjet ink sets are now commercialized, wherein the different inks are not sufficiently matched with each other. For example, the combined absorption of all inks does not give a complete absorption over the whole visible spectrum, e.g., "gaps" exist between the absorption spectra of the colorants. Another problem is that one ink might be absorbing in the range of another ink. The resulting color gamut of these inkjet ink sets is low or mediocre.

EXAMPLES

Materials

All materials used in the following examples were readily available from standard sources such as Aldrich Chemical Co. (Belgium) and Acros (Belgium) unless otherwise specified. The water used in the examples was demineralized water.

DEGDEE is diethylene glycol diethylether from ACROS.

SOLSPERSE™ 32000 is a hyperdispersant from NOVEON.

PY120 is the abbreviation for C.I. Pigment Yellow 120 for which Novoperm™ Yellow H2G, from Clariant was used.

PY155 is an abbreviation for C.I. Pigment Yellow 155, for which Novoperm™ Yellow 4G from CLARIANT was used.

PY213 is an abbreviation for C.I. Pigment Yellow 213, for which Ink Jet Yellow H5G from CLARIANT was used.

BAC is an abbreviation for benzyldimethyldodecyl ammonium chloride from ALDRICH CHEMICAL Co.

Dimethyl-5-amino-isophtalate from ALDRICH.

5-aminobenzimidazolone from UBICHEM.

Diketene from ALDRICH.

5-amino-isophtalic acid from ACROS.

Measurement Methods

1. Pigment Composition by LC-MS

First, a sample was prepared by dissolving 0.5 mg of pigment in 20 mL of dimethylsulfoxide using ultrasonic treatment followed by filtration.

5 μL of the sample was then injected on an YMC AQ analytical column from YMC Inc. of 50 mm length and 2 mm diameter containing 3 μm particles mounted in an AGILENT 1100 from AGILENT and an Esquire-LC from BRUKER. A gradient elution was performed at 0.2 mL/min. and 40° C. by starting with eluent A (9:1 mixture of water:methanol containing 10 mmol ammonium acetate) and gradually replacing it by eluent B (methanol containing 10 mmol ammonium acetate) according to Table 1:

TABLE 1

| Time | % Eluent B |
|---|---|
| 0 min. | 60 |
| 5 min. | 60 |
| 18 min. | 100 |

Detection was performed using a UV/VIS-diode-array at 300 nm and MS using ESI as an ionization source, a nebulizer set at 20 psi with 10 L/min of dry gas at a dry temperature of 350° C., an auto MS/MS fragment amplification of 0.8 and ammonium formiate/ammonium chloride as a post-column modifier. On the basis of LC-MS$^n$ information, the composition of the original pigment was represented in UV/VIS-area %.

2. Pigment Composition Using MS-Flow

First, a sample was prepared by dissolving 1.0 mg of pigment in 20 mL of dimethylsulfoxide and 200 μL of 1,8-diazabicyclo 5,4,o-undec-7-ene (DBU). The sample was then injected into an Esquire-LC from BRUKER.

Detection was performed by MS using ESI as an ionization source, a nebulizer set at 20 psi with 10 L/min of dry gas at a dry temperature of 350° C., an auto MS/MS fragment amplification of 0.8 and ammonium formiate/ammonium chloride as a post-column modifier.

Internal normalization of the intensities of the molecular ion of the pigment compounds after background substraction was used to calculate the ratio of the pigment compounds in the pigment.

3. Titrations

In the titrations, the amount of the second compounds SEC according to Formula (I) is calculated as if all compounds had only one carboxyl group. This leads to an exaggeration of the amount of the second compound SEC according to Formula (I) present on the pigment surface.

3(a). Titration of Pigment Surface 1.5 g of pigment was added to 150 mL of MeOH and stirred for 15 minutes at room temperature. The pigment suspension was then titrated at room temperature with 0.1N tetrabutylammoniumhydroxide in 8:2 mixture of toluene:MeOH. The electrodes used in the titration were glass and Ag/AgCl with a 3 molar solution of lithium chloride as inner and outer electrolyte.

3(b). Zeta Potential Titration of Pigment Surface 425 g water was brought to a pH between 8.0 and 8.5 by the addition of 25 mL of KOH/Boric acid buffer pH 10 from MERCK. A pigment suspension was prepared by adding 50 g of pigment to the buffered solution. The zeta-potential of this suspension was measured while stirring at room temperature with a DT1200 apparatus from Dispersion Technology, Inc (USA) for 30 minutes until the measured zeta-potential was at a constant value. Then the titration was started by adding a solution of BAC (34.0 g BAC/L water) in steps of 0.2 mL until the zero point of charge was reached.

4. Particle Size

The average particle size of pigment particles in pigment dispersions and inkjet inks was determined by photo correlation spectroscopy at a wavelength of 633 nm with a 4 mW HeNe laser on a sample diluted to 0.002% pigment. The particle size analyzer used was a Malvern™ nano-S available from Goffin-Meyvis. The Z-average value obtained according to the ISO13321 method was used as the average particle size value.

The sample was prepared by diluting the disperison or ink with ethyl acetate to 0.002% of pigment. The measured particle size is the average value of 3 consecutive measurements consisting of 6 runs of 20 seconds. For good ink jet characteristics (jetting characteristics and print quality), the average particle size of the dispersed particles should be below 200 nm, preferably about 100 to 175 nm. The pigmented inkjet ink is considered to be a stable pigment dispersion if the particle size remained below 200 nm after a heat treatment of 7 days at 80° C.

5. Viscosity

The viscosity of the pigment dispersions was measured by an AR-G2 rheometer from TA Instruments in a shear stress controlled mode at 20° C. The value at 10 Pa was used for the viscosity of the pigment dispersion.

6. Measurement of SSF

The spectral separation factor SSF of the ink was calculated by using the data of the recorded spectrum of an ink solution and comparing the maximum absorbance to the absorbance at a reference wavelength. The reference wavelength is dependent on the pigment(s) used:

- if the color ink has a maximum absorbance $A_{max}$ between 400 and 500 nm then the absorbance $A_{ref}$ must be determined at a reference wavelength of 600 nm,
- if the color ink has a maximum absorbance $A_{max}$ between 500 and 600 nm then the absorbance $A_{ref}$ must be determined at a reference wavelength of 650 nm, and
- if the color ink has a maximum absorbance $A_{max}$ between 600 and 700 nm then the absorbance $A_{ref}$ must be determined at a reference wavelength of 830 nm.

The absorbance was determined in transmission with a Shimadzu UV-2101 PC double beam-spectrophotometer. The ink was diluted with ethyl acetate to have a pigment concentration of 0.002%. A spectrophotometric measurement of the UV-VIS-NIR absorption spectrum of the diluted ink was performed in transmission-mode with a double beam-spectrophotometer using the settings of Table 2. Quartz cells with a path length of 10 mm were used and ethyl acetate was chosen as a blank.

TABLE 2

| Mode | Absorbance |
|---|---|
| Wavelength range | 240-900 nm |
| Slit width | 2.0 nm |
| Scan interval | 1.0 nm |
| Scan speed | Fast (1165 nm/min) |
| Detector | photo-multiplier(UV-VIS) |

Efficient pigmented inkjet inks exhibiting a narrow absorption spectrum and a high maximum absorbance have a value for SSF of more than 30.

Example 1

This example illustrates the method for preparing a pigment in accordance with a preferred embodiment of the present invention by hydrolyzation of C.I. Pigment Yellow 120.

Hydrolyzation

The pigment C.I. Pigment Yellow 120 can be hydrolyzed into two compounds A and B, having 1 respectively 2 carboxyl groups:

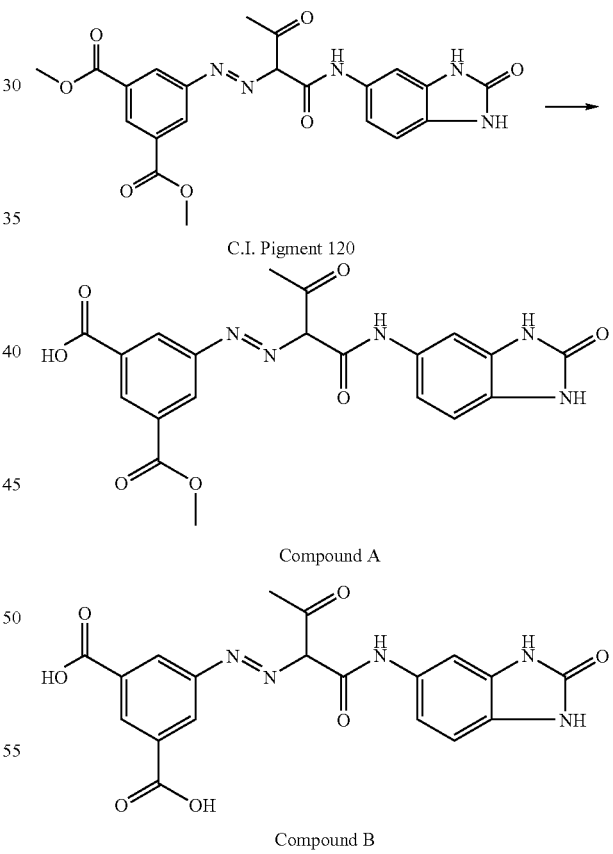

C.I. Pigment 120

Compound A

Compound B

C.I. Pigment Yellow 120 is only available from a single commercial source and usually contains already small amounts of compound A and/or B. The compounds A and B are present due to a number of reasons, such as impurities in the aromatic amine used in the diazotization reaction or uncontrolled hydrolyzation in the finish step of the pigment synthesis.

A typical PY120-batch was found to have 0.8 weight % of compounds A and B on the pigment surface when titrated with BAC. There were only two outliers having an amount of compounds A and B on the pigment surface of 1.5 respectively 1.7 weight % based upon the total weight of the pigment. Although these pigments could be dispersed much better, the dispersion quality was still insufficient.

Hydrolyzation with $H_2SO_4$

A PY120 batch having a total content of compounds A and B of 2.9 weight % based upon the total weight of the pigment was used to prepare pigment sample 1.

In 20 mL water, 1.00 gram of PY120 and 2.00 mL of concentrated $H_2SO_4$ were added and stirred for 4 hours at 90° C. in a closed container. After that it was cooled to 20° C. The content was filtered, washed with water and dried at 50° C. to deliver pigment sample 1.

Hydrolyzation with NaOH

The same batch was used as in preparing pigment sample 1. In 20 mL water 1.00 gram of PY120 and 0.0275 g of concentrated NaOH were added and stirred for 4 hours at 90° C. in a closed container. After that it was cooled to 20° C., 0.50 mL of acetic acid was added to convert the sodium salt of compounds A and B to the acid form. The content was filtered, washed with water and dried at 50° C. to deliver pigment sample 2.

The pigment composition of PY120 and the pigment samples 1 and 2 were determined by LC-MS" and are shown in Table 3. It was found that UV/VIS-area % detection in LC-MS corresponds very well to the weight % of a compound in the pigment based upon the total weight of the pigment.

TABLE 3

| Pigment Sample | Pigment Composition (UV/VIS-area %) | | |
|---|---|---|---|
| | C.I. Pigment Yellow 120 (MW 453) | Compound A (MW 439) | Compound B (MW 425) |
| PY120 | 97.1 | 2.1 | 0.8 |
| Sample 1 | 96.4 | 2.8 | 0.8 |
| Sample 2 | 95.0 | 1.9 | 3.1 |

From Table 3, it can be seen that the amount of compounds A and/or B were increased by the hydrolyzation. Hydrolyzation to compound B was however only accomplished by the method using concentrated NaOH. The decrease in compound A for sample 2 is due to the conversion of at least part of compound A present on the pigment surface to compound B. In an alkaline medium it is expected that the deprotonated compound A can be at least partly detached from the pigment surface allowing the hydrolyzation of the second methyl ester group which normally "sticks" into the pigment surface. In an acidic medium, almost no detachment of compound A is possible since it is protonated and hence compound B is practically not formed.

Example 2

This example illustrates the hydrolyzation of C.I. Pigment Yellow 155 and C.I. Pigment Yellow 213 shown in Table 4. Although C.I. Pigment Yellow 155 contains four methylester groups which can be hydrolyzed, in the hydrolyzation it was observed that only one methyl ester group was hydrolyzed. On the other hand in C.I. Pigment Yellow 213, hydrolyzation to compounds having one and/or two carboxyl groups was observed. The same batches of C.I. Pigment Yellow 155 and C.I. Pigment Yellow 213 were used in preparing the samples.

TABLE 4

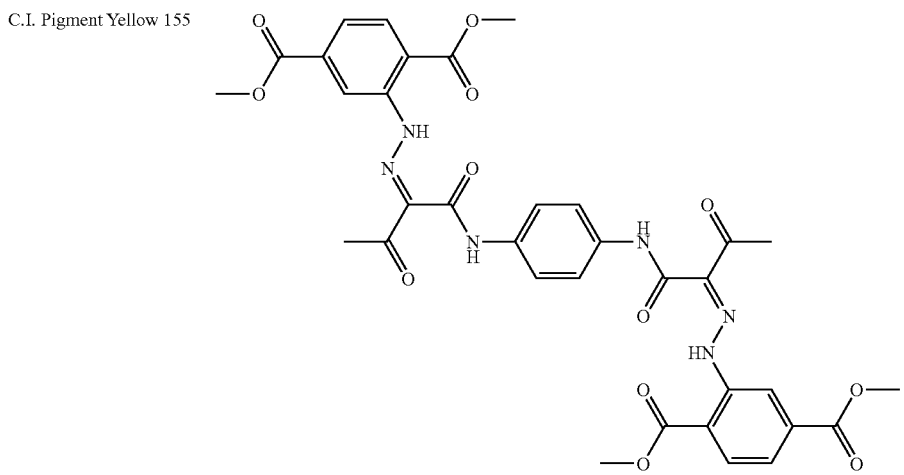

C.I. Pigment Yellow 155

TABLE 4-continued

C.I. Pigment Yellow 213

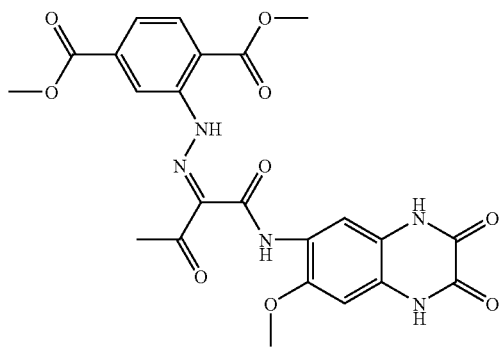

Hydrolyzation with H$_2$SO$_4$

Hydrolyzation with H$_2$SO$_4$ was performed in exactly the same manner as in EXAMPLE 1 except that pigment PY120 was replaced by PY155 for pigment sample 3 and by PY213 for pigment sample 4.

Hydrolyzation with HCl

In 20 mL water 1.00 gram of PY155 and 5.00 mL of concentrated HCl were added and stirred for 4 hours at 90° C. in a closed container. After that it was cooled to 20° C. The content was filtered, washed with water and dried at 50° C. to deliver pigment sample 5.

The hydrolyzation with HCl was repeated in the same manner for PY213 to deliver pigment sample 6.

Hydrolyzation with NaOH

Hydrolyzation with NaOH was performed in exactly the same manner as in EXAMPLE 1 except that pigment PY120 was replaced by PY155 for pigment sample 7 and by PY213 for pigment sample 8.

Hydrolyzation with NaOH at 20° C.

The effect of the temperature at which the hydrolyzation is illustrated by the following method.

In 20 mL water 1.00 gram of PY155 and 0.0275 g of concentrated NaOH were added and stirred for 16 hours at 20° C. in a closed container. After that it was cooled to 20° C., 0.50 mL of acetic acid was added. The content was filtered, washed with water and dried at 50° C. to deliver pigment sample 9.

The hydrolyzation was repeated in the same manner for PY213 to deliver pigment sample 10.

The pigment composition could not be determined by LC-MS due to the poor solubility of the pigment samples in dimethylsulfoxide. Therefore the pigment composition was determined by MS-flow. This method is less accurate but sufficient for the purpose of demonstrating hydrolyzation. In addition, the results were confirmed by a verification using NMR.

TABLE 5

| Pigment sample | C.I. Pigment Yellow 155 | C.I. Pigment Yellow 213 | Compound with 1 —COOH group | Compound with 2 —COOH groups |
|---|---|---|---|---|
| PY155 | 99 | — | 1 | — |
| PY213 | — | 98 | 2 | <1 |
| Sample 3 | 99 | — | 1 | — |
| Sample 4 | — | 95 | 4 | 1 |
| Sample 5 | 97 | — | 3 | — |
| Sample 6 | — | 96 | 3 | 1 |
| Sample 7 | 97 | — | 3 | — |
| Sample 8 | — | 93 | 2 | 5 |
| Sample 9 | 99 | — | 1 | — |
| Sample 10 | — | 98 | 2 | <1 |

From Table 5, it should be clear that in most cases hydrolyzation was accomplished. Although the hydrolyzation was conducted for 16 hours instead of 4 hours, no significant increase in compounds having one or two carboxyl groups was observed in samples 9 and 10, which were treated at 20° C. instead of 50° C., indicating the importance of performing the hydrolyzation process at a higher temperature.

Example 3

This example illustrates that addition of a sufficient amount of second compounds SEC according to Formula (I) present on the pigment surface results in an improved dispersion quality and stability.

Synthesis of a Second Compound SEC-1 According to Formula (I)

First, a reactant 1 was prepared according to the following synthesis scheme:

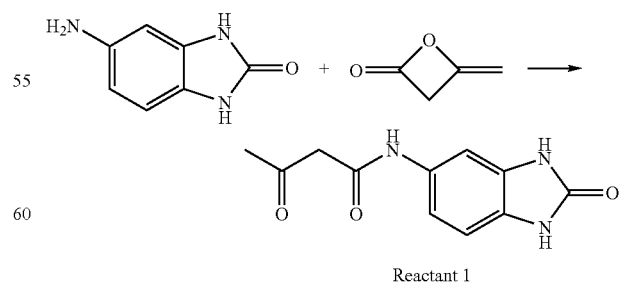

Reactant 1

A suspension of 14.9 g (0.1 mol) of 5-aminobenzimidazolone in 200 mL acetonitrile was heated to about 100° C. and 8.4 g (0.1 mol) of diketene was added. After addition of the diketene, the temperature was maintained at 100° C. for 2 hours before the charge was cooled. The resulting product, reactant 1, was filtered and washed with acetonitrile. The yield was 87%.

Then a reactant 2 was prepared according to the following synthesis scheme:

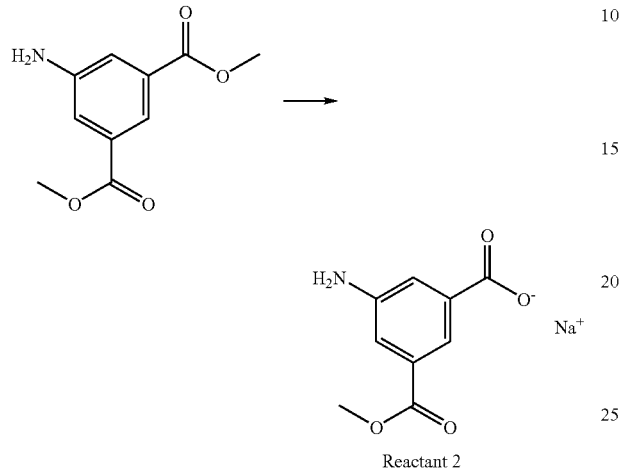

Reactant 2

104.5 g (0.5 mol) of dimethyl-5-amino-isophtalate in 1000 mL methanol was heated to about 60° C. and 69.0 g (0.55 mol) of NaOH was added. After stirring the solution at 60° C. for one hour, 0.3 mL of acetic acid was added. The methanol was evaporated until 300 mL of solution was left, which was then cooled to 20° C. Then 300 mL of methyl acetate was added and the solution was filtrated and washed with methyl acetate and filtrated again. The filtrate was dried to evaporate all the solvent. Then 300 mL of methylacetate and 10 mL of methanol was added and the mixture was filtrated, washed with methyl acetate and filtrated again, to be finally dried at 50° C. 47 g of reactant 2 was obtained.

Formation of the second compound SEC-1 according to Formula (I) was accomplished by diazotation of reactant 2 and subsequent coupling with reactant 1 according to the following synthesis scheme:

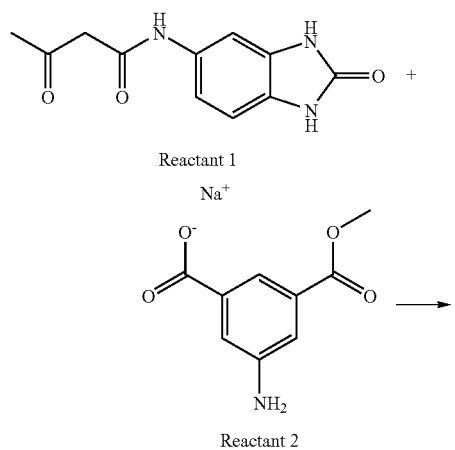

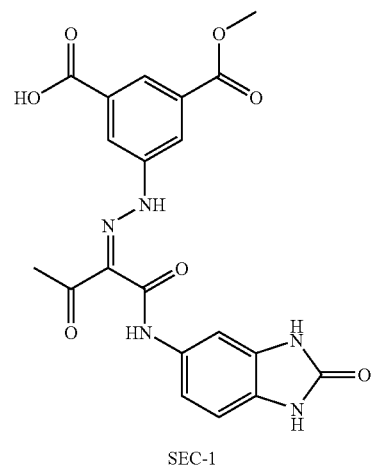

SEC-1

To 21.7 g (0.1 mol) of reactant 2 in 300 mL water was added 0.9 g of sodiumnitrite. The solution was poured out in 500 mL of methanol and cooled to 0° C. 36.0 g of concentrated hydrochloric acid was slowly added. The diazonium-salt was kept at a temperature between 0 and 5° C. After 15 minutes the excess of nitrite was neutralized by adding 3.0 g (0.03 mol) of sulfamic acid followed by adding 25.0 g (0.3 mol) of sodiumcarbonate. While the diazionium-salt was made, 23.3 g (0.1 mol) of reactant 1 was dissolved in a mixture of 200 mL methanol with 100.0 mL water and 12.5 g of NaOH. This solution was dropped under stirring into the diazonium-salt solution while the temperature was maintained at 20° C. for about 2 hours. 500 mL of water and 30 ml of acetic acid was added to mixture which was stirred for 16 hours at 20° C. The yellow product was filtered and washed with water and then dried at 50° C. 35 g of SEC-1 was obtained.

Synthesis of a Second Compound SEC-2 According to Formula (I)

Formation of the second compound SEC-2 according to Formula (I), was accomplished by diazotation of reactant 3 and subsequent coupling with reactant 1 according to the following synthesis scheme:

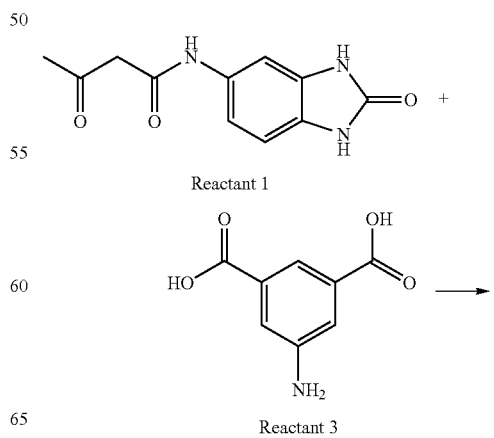

-continued

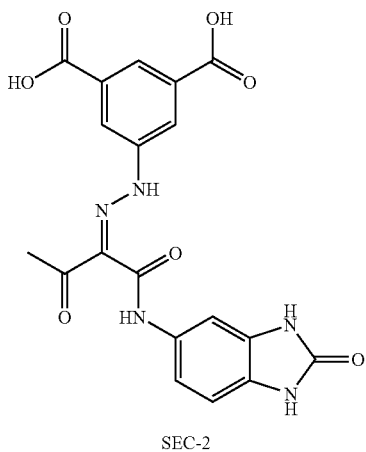

SEC-2

18.1 g (0.1 mol) of reactant 3 in 300 mL water was dissolved by adding 10 mL (0.1 mol) of a 29% sodiumhydroxide-solution. 8.97 g (0.13 mol) of sodiumnitrite was added and the colorless solution was dropwise added to cooled concentrated hydrochloric acid (29.98 mL; 0.36 mol). The diazonium-salt was kept at a temperature between 0 and 5° C. After 15 minutes the excess of nitrite was neutralized by adding 3.0 g (0.03 mol) of sulfamic acid and a pH of 7 was obtained by adding 25.2 g (0.3 mol) of sodiumcarbonate. While the diazionium-salt was made, 23.3 g (0.1 mol) of reactant 1 was dissolved in a mixture of 500 mL methanol and 10.0 mL (0.1 mol) 29% sodiumhydroxide-solution. This solution was dropped into the diazonium-salt solution and a yellow suspension is immediately formed. The temperature was maintained between 0 and 5° C. for about 3 hours and the yellow product SEC-2 was filtered and washed with methanol. The yield was 70%.

Preparation and Evaluation of Pigment Dispersions

A typical batch of PY120 was used to prepare non-aqueous pigment dispersions 2 to 6 by addition of increasing amounts of compound SEC-1 (corresponding to compound A with 1 carboxyl group) and non-aqueous pigment dispersions 7 to 10 by addition of increasing amounts of compound SEC-2 (corresponding to compound B with 2 carboxyl groups). All pigment dispersions 1 to 10 were prepared in the same manner to obtain a composition as described in Table 6 and Table 7 except that part of the dispersion medium DEGDEE in the milling mixture was used to compensate for the amount of compound SEC-1 or SEC-2.

TABLE 6

| weight % of compound: | Pigment dispersion | | | | | |
|---|---|---|---|---|---|---|
| | 1 | 2 | 3 | 4 | 5 | 6 |
| PY120 | 15.00 | 15.00 | 15.00 | 15.00 | 15.00 | 15.00 |
| Solsperse ™ 32000 | 15.00 | 15.00 | 15.00 | 15.00 | 15.00 | 15.00 |
| SEC-1 | — | 0.05 | 0.15 | 0.30 | 0.60 | 0.80 |
| DEGDEE | 70.00 | 69.95 | 69.85 | 69.70 | 69.40 | 69.20 |

TABLE 7

| weight % of compound: | Pigment dispersion | | | |
|---|---|---|---|---|
| | 7 | 8 | 9 | 10 |
| PY120 | 15.00 | 15.00 | 15.00 | 15.00 |
| Solsperse ™ 32000 | 15.00 | 15.00 | 15.00 | 15.00 |
| SEC-2 | 0.15 | 0.30 | 0.60 | 0.80 |
| DEGDEE | 69.85 | 69.70 | 69.40 | 69.20 |

A milling mixture with 15 wt % pigment and 15 wt % dispersant was prepared by adding the pigment PY120, the polymeric dispersant Solsperse™ 32000 and optionally the compound SEC-1 or SEC-2 to the dispersion medium DEGDEE. The milling mixture was then milled under cooling by a NETZSCH™ LABSTAR1 at a 50% volume filling with yttrium-stabilized zirconium oxide-beads of 0.4 mm diameter ("high wear resistant zirconia grinding media" from TOSOH Co.) and a residence time of 45 minutes.

The pigment batch of PY120 was titrated with BAC to determine the amount of compounds A and B on the pigment surface ("Surface A+B" in Table 8). For pigment dispersions 2 to 10, the amounts of SEC-1 and SEC-2 present in the pigment dispersions were added to "Surface A+B". The average particle size and the viscosity of the non-aqueous pigment dispersions were determined and are also shown in Table 9.

TABLE 8

| Pigment dispersion | SEC | Surface A + B | Particle size (nm) | Viscosity (mPa · s) |
|---|---|---|---|---|
| 1 | — | 1.1 | 298 | 22788 |
| 2 | SEC-1 | 1.4 | 219 | 35 |
| 3 | SEC-1 | 2.1 | 179 | 16 |
| 4 | SEC-1 | 3.1 | 156 | 12 |
| 5 | SEC-1 | 5.1 | 155 | 12 |
| 6 | SEC-1 | 6.4 | 152 | 13 |
| 7 | SEC-2 | 2.1 | 192 | 20 |
| 8 | SEC-2 | 3.1 | 161 | 15 |
| 9 | SEC-2 | 5.1 | 159 | 12 |
| 10 | SEC-2 | 6.4 | 155 | 13 |

Table 8 shows that pigment dispersion 1 was of poor dispersion quality, while pigment dispersion 2 almost reached the required dispersion quality. Pigment dispersions 3 to 10 all exhibited good dispersion quality.

Example 4

This example illustrates the improved dispersion quality of C.I. Pigment Yellow 120-pigment having a pigment surface including a sufficient amount of the second compound SEC obtained through hydrolyzation.

Hydrolyzation with $H_2SO_4$

The hydrolyzation process with $H_2SO_4$ as described in EXAMPLE 1 was repeated but at a temperature of 100° C.

The same PY120 batch of EXAMPLE 3 was used. In 2000 mL water, 200 gram of PY120 and 400 gram of concentrated $H_2SO_4$ were added and then stirred for 4 hours at 100° C. in a closed container. After that, it was cooled to 20° C. The content was filtered, washed with water and dried at 50° C. to deliver pigment sample 11.

The pigment composition of PY120 and pigment sample 11 was determined by LC-MS. The results are shown in Table 9. It was found that UV/VIS-area % detection in LC-MS corresponds very well to the weight % of a compound in the pigment based upon the total weight of the pigment.

TABLE 9

| Pigment sample | Pigment Composition (UV/VIS-area %) | | |
|---|---|---|---|
| | C.I. Pigment Yellow 120 (MW 453) | Compound A (MW 439) | Compound B (MW 425) |
| PY120 | 97.1 | 2.1 | 0.8 |
| Sample 11 | 95.6 | 3.2 | 1.2 |

From Table 9, it can be seen that the amount of compounds A and B was increased by the hydrolyzation.

Pigment sample 11 was also titrated with BAC. The amount of compounds A and B on the pigment surface (Surface A+B) is shown in Table 10, as well as the total content of compounds A and B (Total content A+B) in the pigment.

Preparation and Evaluation of Pigment Dispersions

The pigment dispersion 1 of EXAMPLE 3, including the untreated PY120 batch, was compared with a pigment dispersion of pigment sample 11. This pigment dispersion 11 of pigment sample 11 was prepared in the same manner, except that the residence time was only 35 minutes instead of 45 minutes.

The average particle size and the viscosity of the non-aqueous pigment dispersions 1 and 7 are shown in Table 10.

TABLE 10

| Pigment dispersion | weight % of total weight of the pigment | | Particle size (nm) | Viscosity (mPa · s) |
|---|---|---|---|---|
| | Total content A + B | Surface A + B | | |
| 1 | 2.9 | 1.1 | 298 | 22788 |
| 11 | 4.4 | 3.9 | 166 | 18 |

Table 10 shows that the pigment dispersion 1 exhibited poor dispersion quality, while pigment dispersion 11 exhibited good dispersion quality.

Example 5

This example illustrates the improved dispersion quality of PY213 by addition of a second compound SEC according to Formula (I).

Preparation and Evaluation of Pigment Dispersions

A batch of PY213 was titrated to determine the amount of compounds C, D and/or E of Table 11 on the pigment surface.

TABLE 11

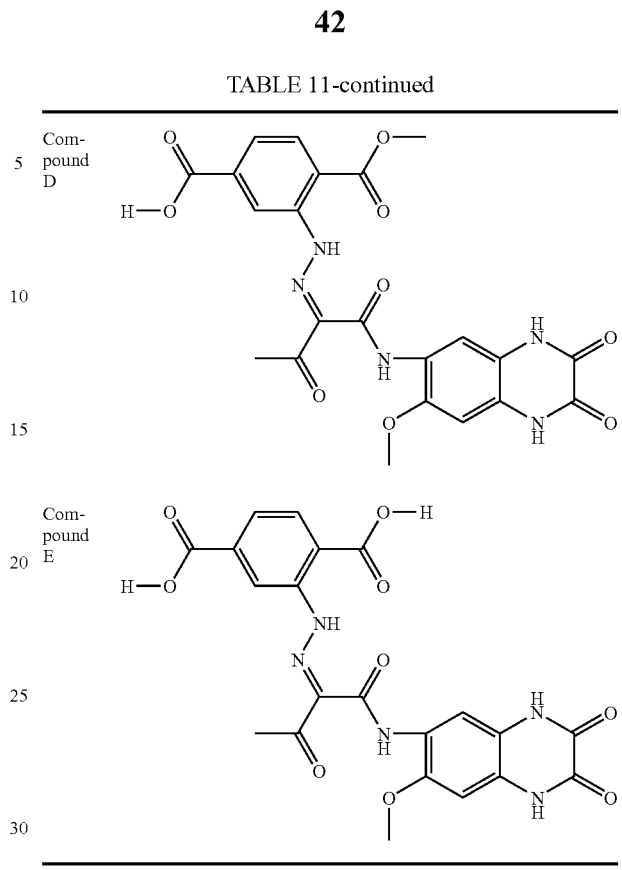

All pigment dispersions 12 to 17 were prepared in the same manner to obtain a composition as described in Table 12, except that a portion of the solvent DEGDEE in the milling mixture was used to compensate for the increasing amount of compound SEC-2.

TABLE 12

| weight % of compound: | Pigment dispersions | | | | | |
|---|---|---|---|---|---|---|
| | 12 | 13 | 14 | 15 | 16 | 17 |
| PY213 | 15.00 | 15.00 | 15.00 | 15.00 | 15.00 | 15.00 |
| Solsperse ™ 32000 | 15.00 | 15.00 | 15.00 | 15.00 | 15.00 | 15.00 |
| SEC-2 | — | 0.25 | 0.50 | 0.75 | 1.00 | 1.50 |
| DEGDEE | 70.00 | 69.75 | 69.50 | 69.25 | 69.00 | 68.50 |

A milling mixture with 15 wt % pigment and 15 wt % dispersant was prepared by adding the pigment PY213, the polymeric dispersant Solsperse™ 32000 and optionally the compound SEC-2 to the solvent DEGDEE. The milling mixture was then milled under cooling by a NETZSCH™ LAB-STAR1 at a 50% volume filling with yttrium-stabilized zirconium oxide-beads of 0.4 mm diameter ("high wear resistant zirconia grinding media" from TOSOH Co.) and a residence time of 45 minutes.

The average particle size and the viscosity of the non-aqueous pigment dispersions were determined. The amount of compounds having carboxyl groups (see "wt % SEC-compounds on the pigment surface" in Table 13) on the pigment surface of the PY213 batch was determined by titration with tetrabutylammoniumhydroxide. The results are shown in Table 13.

TABLE 13

| Pigment dispersion | wt % SEC-compounds on the pigment surface | Particle size (nm) | Viscosity (mPa·s) |
|---|---|---|---|
| 12 | 0.5 | 190 | 129 |
| 13 | 2.2 | 115 | 23 |
| 14 | 3.8 | 111 | 20 |
| 15 | 5.5 | 115 | 23 |
| 16 | 7.2 | 113 | 20 |
| 17 | 10.5 | 115 | 24 |

Table 13 shows that pigment dispersion 12 was of poor dispersion quality, while pigment dispersions 13 to 17 having at least 2.0 weight % all exhibited good dispersion quality.

Example 6

This example illustrates the improved dispersion stability of PY213 by addition of a second compound SEC-3 according to Formula (I) having a larger similarity with C.I. Pigment Yellow 213 than SEC-1.

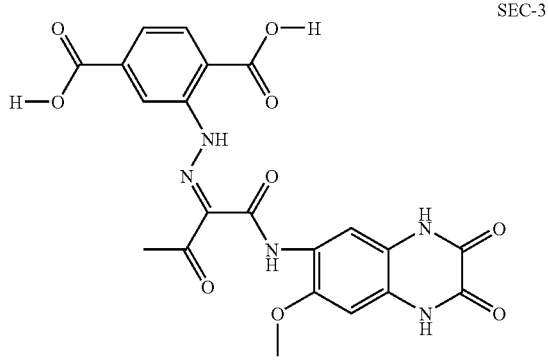

Synthesis of SEC-3

The compound SEC-3 was synthesized starting from PY213 according to the following synthesis scheme:

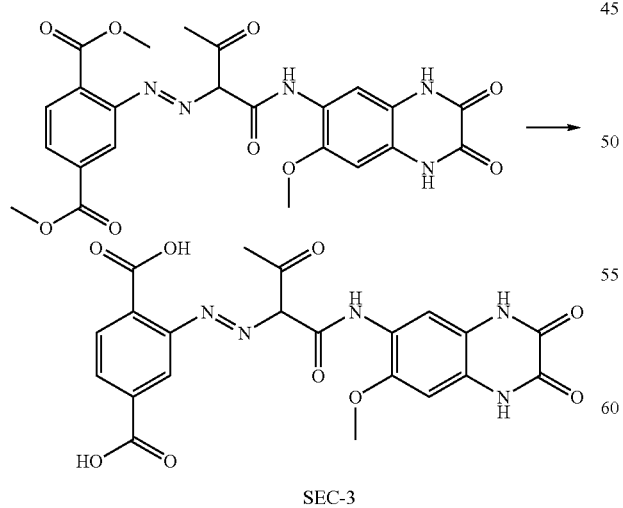

SEC-3

30.0 g of PY213 was taken and thereto 2000 mL water was added, followed by the addition of 80 g concentrated NaOH. This mixture was stirred for 20 minutes at 75° C. The mixture was cooled to 60° C. and 100 mL of $CH_3COOH$ was added. Then, the mixture was further cooled and kept at 20° C. for 16 hours. The resulting product was filtrated and washed with water, and finally dried at 50° C. This resulted in 28 g of SEC-3.

Preparation and Evaluation of Inkjet Inks

Two inkjet inks INK-1 and INK-2 were prepared in the same manner to obtain a composition as described in Table 14, except that the compound SEC-3 was either absent or present. In the absence of compound SEC-3, a pigment concentration of 5.00 wt % instead of 4.50 wt % was used.

TABLE 14

| wt % of component | INK-1 | INK-2 |
|---|---|---|
| PY213 | 5.00 | 4.50 |
| SEC-3 | — | 0.50 |
| Solsperse™ 32000 | 5.00 | 5.00 |
| DEGDEE | 90.00 | 90.00 |

An ink composition was made by mixing the pigment, the polymeric dispersant Solsperse™ 32000, optionally the compound SEC-3 and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lid and put on the roller mill for three days. The speed was set at 150 rpm. After milling the dispersion was separated from the beads using a filter cloth.

Evaluation of Inkjet Inks

The average particle size and the spectral separation factor SSF were determined after a heat treatment of 7 days at 80° C. for both inks. The results are listed in Table 15.

TABLE 15

| Inkjet ink | SEC-3 | After 7 days at 80° C. | |
|---|---|---|---|
| | | SSF | particle size |
| INK-1 | No | 30 | 310 nm |
| INK-2 | Yes | 62 | 161 nm |

Table 15 shows that INK-2 exhibits good dispersion stability.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A color pigment comprising:
   at least 70.0 weight % of a first compound COP according to Formula (COP-I) based upon the total weight of the color pigment:

Formula (COP-I)

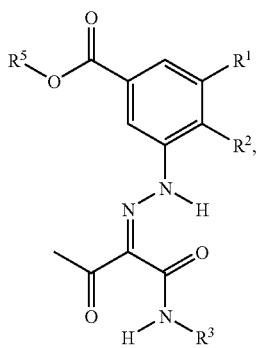

wherein one of $R^1$ and $R^2$ is hydrogen and the other one of $R^1$ and $R^2$ represents —COOR$^4$;
$R^4$ and $R^5$ represent methyl;
$R^3$ is selected from the group consisting of:

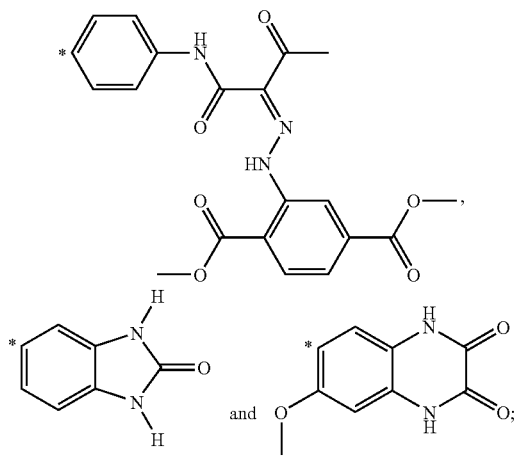

and * represents the point of attachment of $R^3$ to the nitrogen in Formula (COP-1); wherein
the color pigment has a pigment surface including between 2.0 and 30.0 weight % of a second compound SEC according to Formula (SEC-I) based upon the total weight of the color pigment:

Formula (SEC-I)

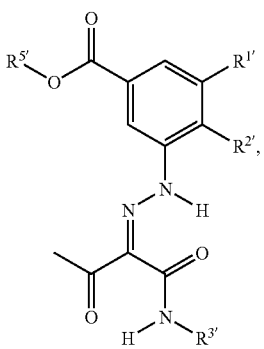

wherein one of $R^{1'}$ and $R^{2'}$ is hydrogen and the other one of $R^{1'}$ and $R^{2'}$ represents —COOR$^{4'}$;
$R^{4'}$ and $R^{5'}$ represent methyl or hydrogen;
$R^{3'}$ is selected from the group consisting of:

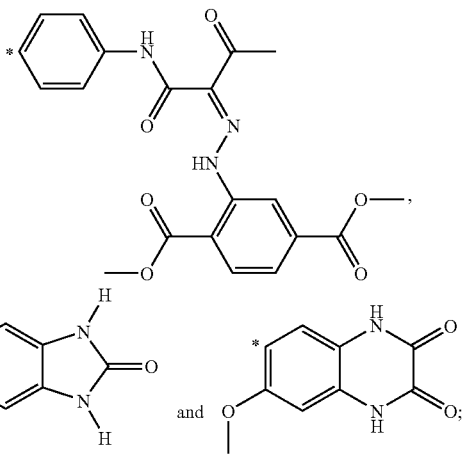

and * represents the point of attachment of $R^{3'}$ to the nitrogen in Formula (SEC-I), with the proviso that at least one of $R^{4'}$ and $R^{5'}$ represents hydrogen.

2. The color pigment according to claim 1, wherein the second compound SEC according to Formula (SEC-I) is present between 2.5 and 15.0 weight % based upon the total weight of the color pigment.

3. The color pigment according to claim 1, wherein the first compound COP according to Formula (COP-I) corresponds with the chemical structure of a color pigment selected from the group consisting of C.I. Pigment Yellow 120, C.I. Pigment Yellow 155, C.I. Pigment Yellow 175, and C.I. Pigment Yellow 213.

4. The color pigment according to claim 1, wherein the second compound SEC according to Formula (SEC-I) is represented by:

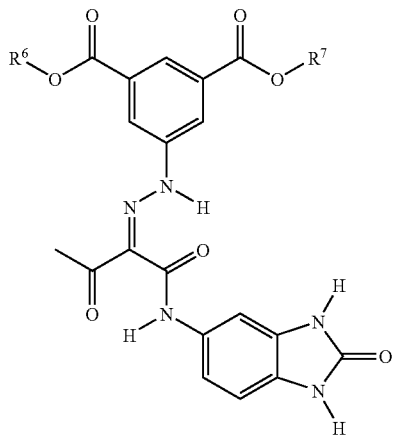

wherein $R^6$ and $R^7$ are independently selected from the group consisting of hydrogen and methyl, with the proviso that at least one of $R^6$ and $R^7$ represents hydrogen.

5. The color pigment according to claim 4, wherein $R^6$ and $R^7$ both represent hydrogen.

6. A method of preparing a color pigment as defined by claim 1, comprising the steps of:

a) providing a liquid medium wherein the color pigment is selected from the group consisting of C.I. Pigment Yellow 120, C.I. Pigment Yellow 155, C.I. Pigment Yellow 175, and C.I. Pigment Yellow 213;
b) forming on a surface of the color pigment the second compound SEC according to Formula (SEC-I) by performing step b1) and/or b2):
b1) hydrolyzing on the pigment surface of the color pigment including at least 70.0 weight % of the first compound COP according to Formula (COP-1) one or two of the methyl ester groups —COOR$^4$ and —COOR$^5$ of the color pigment;
b2) adding the second compound SEC according to Formula (SEC-I) to the liquid medium including the color pigment; and
c) removing the liquid medium to obtain a dry color pigment.

7. The method according to claim 6, wherein the liquid medium is an aqueous medium.

8. A method of preparing a non-aqueous pigment dispersion comprising the steps of:
a) providing a non-aqueous liquid medium including a color pigment selected from the group consisting of C.I. Pigment Yellow 120, C.I. Pigment Yellow 155, C.I. Pigment Yellow 175, and C.I. Pigment Yellow 213; and
b) forming on a surface of the color pigment a second compound SEC according to Formula (SEC-1) by performing step b1) and/or b2):
b1) hydrolyzing on the pigment surface of the color pigment including at least 70.0 weight % of a first compound COP one or two methyl ester groups —COOR$^4$ and —COOR$^5$ of the color pigment;
b2) adding the second compound SEC to the liquid medium including the color pigment; wherein
the second compound SEC is represented by Formula (SEC-I):

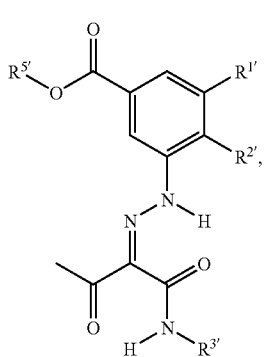

Formula (SEC-I)

one of R$^1$ and R$^2$ is hydrogen and the other one of R$^1$ and R$^2$ represents —COOR$^4$;
R$^4$ and R$^5$ represent methyl or hydrogen, with the proviso that at least one of R$^4$ and R$^5$ represents hydrogen;
R$^3$ is selected from the group consisting of:

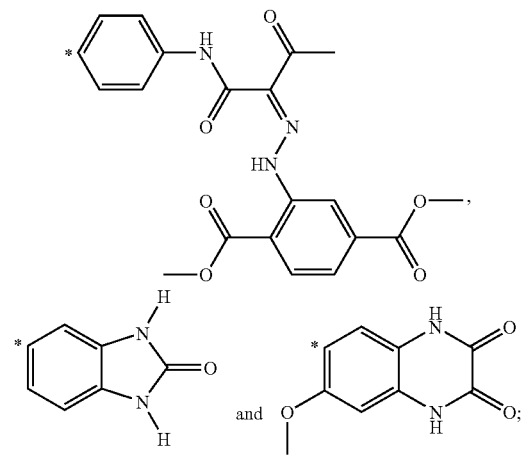

and * represents the point of attachment of R$^3$ to the nitrogen in Formula (SEC-I).

9. The method according to claim 8, wherein a portion of the non-aqueous liquid medium is removed.

10. The method according to claim 8, wherein the pigment is dispersed in the non-aqueous dispersion medium by milling and/or ultrasonic energy.

11. The method according to claim 6, wherein the second compound SEC according to Formula (SEC-I) added to the liquid medium including the color pigment has a smaller molecular weight than the color pigment.

12. The method according to claim 6, wherein step b1) is performed at a temperature of at least 40° C.

13. A non-aqueous pigment dispersion comprising:
the color pigment as defined by claim 1.

14. The non-aqueous pigment dispersion according to claim 13, wherein the average particle size determined by photon correlation spectroscopy at a wavelength of 633 nm with a 4 mW HeNe laser on a sample diluted with ethylacetate to a concentration of 0.002% pigment is less than 200 nm.

15. The non-aqueous pigment dispersion according to claim 13, wherein the non-aqueous pigment dispersion is a radiation curable inkjet ink.

16. The method according to claim 8, wherein the second compound SEC according to Formula (SEC-I) added to the liquid medium including the color pigment has a smaller molecular weight than the color pigment.

* * * * *